US009526990B2

(12) United States Patent
Harris et al.

(10) Patent No.: US 9,526,990 B2
(45) Date of Patent: *Dec. 27, 2016

(54) MANAGING GAME METRICS AND AUTHORIZATIONS

(71) Applicant: Sony Interactive Entertainment America LLC, San Mateo, CA (US)

(72) Inventors: Adam P. Harris, San Diego, CA (US); Steve C. Schneider, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/101,870

(22) Filed: Dec. 10, 2013

(65) Prior Publication Data
US 2014/0100027 A1 Apr. 10, 2014

Related U.S. Application Data

(63) Continuation of application No. 11/449,141, filed on Jun. 7, 2006, now Pat. No. 8,622,837, which is a (Continued)

(51) Int. Cl.
*G07F 17/32* (2006.01)
*A63F 13/75* (2014.01)
*A63F 13/30* (2014.01)

(52) U.S. Cl.
CPC ............... *A63F 13/75* (2014.09); *A63F 13/12* (2013.01); *G07F 17/3241* (2013.01); *A63F 2300/5586* (2013.01)

(58) Field of Classification Search
CPC ..................... A63F 2300/5586; G07F 17/3241
See application file for complete search history.

(56) References Cited

U.S. PATENT DOCUMENTS

| 5,638,446 A | 6/1997 | Rubin |
| 5,768,382 A | 6/1998 | Schneier |

(Continued)

FOREIGN PATENT DOCUMENTS

| CN | 1290437 A | 4/2001 |
| CN | 103429302 | 12/2013 |

(Continued)

OTHER PUBLICATIONS

Ferretti et al., Stefano; "AC/DC: an Algorithm for Cheating Detection by Cheating", Proceedings of the 2006 International Workshop on Network and Operating Systems Support for Digital Audio and Video, NOSSDAV 2006. Jan. 1, 2006.

(Continued)

*Primary Examiner* — Werner Garner
(74) *Attorney, Agent, or Firm* — Polsinelli LLP

(57) ABSTRACT

Various metrics as may be deployed in an active, passive, or hybrid validation architecture are disclosed. A computing device configured to monitor network game activity may identify an inconsistency between user game data and a particular game metric governing a particular aspect of the network gaming environment. Upon identification of an inconsistency between game data and a game metric, which may indicative of illicit game play, a validation process (e.g., active, passive, and/or hybrid) may be implemented to further confirm the existence of illicit game. Alternatively, an action to maintain integrity of the gaming community may be executed without further confirmation whereby a purportedly illicit game device may be ejected from the network.

19 Claims, 7 Drawing Sheets

Related U.S. Application Data continuation-in-part of application No. 11/415,881, filed on May 1, 2006, now Pat. No. 8,771,061, which is a continuation-in-part of application No. 11/386,039, filed on Mar. 20, 2006, now Pat. No. 7,480,656.

(56) References Cited

U.S. PATENT DOCUMENTS

| | | | |
|---|---|---|---|
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,949,876 A | 9/1999 | Ginter et al. | |
| 5,970,143 A | 10/1999 | Schneier | |
| 5,982,891 A | 11/1999 | Ginter et al. | |
| 6,021,219 A | 2/2000 | Andersson et al. | |
| 6,134,237 A | 10/2000 | Brailean et al. | |
| 6,165,072 A | 12/2000 | Davis | |
| 6,237,786 B1 | 5/2001 | Ginter et al. | |
| 6,253,193 B1 | 6/2001 | Ginter et al. | |
| 6,363,488 B1 | 3/2002 | Ginter et al. | |
| 6,389,402 B1 | 5/2002 | Ginter et al. | |
| 6,405,104 B1 | 6/2002 | Dougherty | |
| 6,427,140 B1 | 7/2002 | Ginter et al. | |
| 6,640,304 B2 | 10/2003 | Ginter et al. | |
| 6,658,568 B1 | 12/2003 | Ginter et al. | |
| 6,779,004 B1 | 8/2004 | Zintel | |
| 6,829,634 B1 | 12/2004 | Holt et al. | |
| 6,850,252 B1 | 2/2005 | Hoffberg | |
| 6,850,909 B1 | 2/2005 | Aiello et al. | |
| 6,865,735 B1 | 3/2005 | Sirer et al. | |
| 6,948,070 B1 | 9/2005 | Ginter et al. | |
| 7,043,641 B1 | 5/2006 | Martinek et al. | |
| 7,051,212 B2 | 5/2006 | Ginter et al. | |
| 7,069,451 B1 | 6/2006 | Ginter et al. | |
| 7,076,652 B2 | 7/2006 | Ginter et al. | |
| 7,168,089 B2 | 1/2007 | Nguyen et al. | |
| 7,169,050 B1 | 1/2007 | Tyler | |
| 7,288,027 B2 | 10/2007 | Overton | |
| 7,367,888 B1 | 5/2008 | Chen | |
| 7,392,422 B2 | 6/2008 | Van Datta et al. | |
| 7,480,656 B2 | 1/2009 | Harris et al. | |
| 7,515,718 B2 | 4/2009 | Nguyen | |
| 7,517,282 B1 | 4/2009 | Pryor | |
| 7,543,152 B2 | 6/2009 | Hamalainen et al. | |
| 7,584,154 B1 | 9/2009 | Chen et al. | |
| 7,610,505 B2 | 10/2009 | Datta | |
| 7,695,370 B2 | 4/2010 | Liu | |
| 7,720,962 B2 | 5/2010 | Gupta | |
| 7,753,795 B2 | 7/2010 | Harris et al. | |
| 7,780,526 B2 | 8/2010 | Nguyen | |
| 7,801,957 B2 | 9/2010 | Guo | |
| 8,032,502 B2 | 10/2011 | Harris et al. | |
| 8,033,913 B2 | 10/2011 | Cockerille et al. | |
| 8,057,298 B2 | 11/2011 | Nguyen et al. | |
| 8,065,394 B2 | 11/2011 | Crowder et al. | |
| 8,115,765 B2 | 2/2012 | Sommers | |
| 8,137,200 B2 | 3/2012 | Kelly et al. | |
| 8,251,810 B2 | 8/2012 | Van Luchene | |
| 8,622,837 B2 | 1/2014 | Harris | |
| 8,626,710 B2 | 1/2014 | Harris | |
| 8,715,072 B2 | 5/2014 | Harris | |
| 8,972,364 B2 | 3/2015 | Harris | |
| 2001/0044339 A1 | 11/2001 | Cordero et al. | |
| 2002/0075805 A1 | 6/2002 | Gupta et al. | |
| 2002/0078464 A1 | 6/2002 | Dravida et al. | |
| 2002/0085552 A1 | 7/2002 | Tandom | |
| 2002/0184310 A1 | 12/2002 | Traversat et al. | |
| 2003/0027639 A1 | 2/2003 | Peterson et al. | |
| 2003/0070070 A1 | 4/2003 | Yeager et al. | |
| 2003/0078103 A1 | 4/2003 | LeMay et al. | |
| 2003/0137110 A1 | 7/2003 | Huard et al. | |
| 2003/0176218 A1 | 9/2003 | LeMay et al. | |
| 2003/0177347 A1* | 9/2003 | Schneier | A63F 13/12 713/151 |
| 2003/0195025 A1 | 10/2003 | Hill | |
| 2003/0216962 A1 | 11/2003 | Heller et al. | |
| 2003/0226007 A1 | 12/2003 | Olson et al. | |
| 2003/0229789 A1 | 12/2003 | Morais et al. | |
| 2004/0093372 A1 | 5/2004 | Chen et al. | |
| 2004/0127277 A1 | 7/2004 | Walker et al. | |
| 2004/0166942 A1 | 8/2004 | Muir | |
| 2004/0193919 A1 | 9/2004 | Dabbish et al. | |
| 2004/0242321 A1 | 12/2004 | Overton | |
| 2004/0259633 A1 | 12/2004 | Gentles et al. | |
| 2005/0086288 A1 | 4/2005 | Datta et al. | |
| 2005/0086369 A1 | 4/2005 | Mai et al. | |
| 2005/0101374 A1 | 5/2005 | Acres | |
| 2006/0063590 A1 | 3/2006 | Abassi et al. | |
| 2006/0089200 A1 | 4/2006 | Twerdahl | |
| 2006/0100010 A1 | 5/2006 | Gatto et al. | |
| 2006/0190281 A1 | 8/2006 | Kott et al. | |
| 2006/0221825 A1 | 10/2006 | Okano | |
| 2007/0066398 A1 | 3/2007 | Rowan | |
| 2007/0210929 A1 | 9/2007 | Sabata et al. | |
| 2007/0218996 A1 | 9/2007 | Harris et al. | |
| 2007/0238528 A1 | 10/2007 | Harris et al. | |
| 2007/0276521 A1 | 11/2007 | Harris et al. | |
| 2007/0294399 A1 | 12/2007 | Grossner et al. | |
| 2008/0207319 A1 | 8/2008 | Okada | |
| 2008/0305869 A1 | 12/2008 | Konforty et al. | |
| 2008/0313346 A1 | 12/2008 | Kujawa et al. | |
| 2009/0113515 A1 | 4/2009 | Zalewski | |
| 2010/0029370 A1 | 2/2010 | Robinson et al. | |
| 2010/0197405 A1 | 8/2010 | Douceur et al. | |
| 2011/0269547 A1 | 11/2011 | Harris et al. | |
| 2012/0088585 A1 | 4/2012 | Harris et al. | |
| 2012/0108327 A1 | 5/2012 | Tandon | |
| 2014/0187316 A1 | 7/2014 | Harris | |
| 2014/0309024 A1 | 10/2014 | Harris | |

FOREIGN PATENT DOCUMENTS

| | | |
|---|---|---|
| JP | 2000-040045 | 2/2000 |
| JP | 2004-021549 | 1/2004 |
| JP | 2004-164640 | 6/2004 |
| JP | 2006-006473 | 1/2006 |
| JP | 2014-502175 | 1/2014 |
| WO | WO 2007/109130 | 9/2007 |
| WO | WO 2012/060900 | 5/2012 |

OTHER PUBLICATIONS

Ferretti et al., Stefano; "Game Time Modelling for Cheating Detection in P2P MOGs: a Case Study with a Fast Rate Cheat." Proceedings of 5th ACM Sigcomm Workshop on Network and System Support for Games, NETGAMES 2006, Jan. 1, 2006.

Mizrak et al., Alper T.; "Detecting Malicious Packet Losses", IEEE Transactions on Parallel and Distributed Systems, vol. 20, No. 2, Feb. 1, 2009.

"RTP, Real-Time Transport Protocol", http://www.networksorcery.com/enp/protocol/rtp.htm Date of download: Apr. 22, 2015.

Extended European Search Report for EP 11838378.5 mailed May 4, 2015.

Japanese Application No. 2013-537662 Notification of Reasons for Refusal Mar. 31, 2015.

PCT/US07/006628, International Search Report and Written Opinion mailed Sep. 12, 2008.

Extended European Search Report for EP 07753269.5 mailed Oct. 6, 2011.

U.S. Appl. No. 11/386,039 Office Action mailed Mar. 17, 2008.

U.S. Appl. No. 11/415,881 Final Office Action mailed Dec. 8, 2009.

U.S. Appl. No. 11/415,881, Office Action mailed Jun. 3, 2009.

U.S. Appl. No. 11/415,881 Final Office Action mailed Oct. 15, 2008.

U.S. Appl. No. 11/415,881 Office Action mailed Feb. 22, 2008.

U.S. Appl. No. 11/449,141 Final Office Action mailed May 27, 2010.

U.S. Appl. No. 11/449,141 Office Action mailed Dec. 15, 2009.

U.S. Appl. No. 11/449,141 Final Office Action mailed Aug. 6, 2009.

U.S. Appl. No. 11/449,141 Office Action mailed Feb. 6, 2009.

(56) References Cited

OTHER PUBLICATIONS

U.S. Appl. No. 11/449,141 Office Action mailed Sep. 15, 2008.
"First Pit and Heartfelt . . . about Game Zone cheaters [Archive]—Straight Dope Message Board," Jun. 2, 2003, Straight Dope, available at ,http://board.straightdope.com/sdmb/archive/index.php/t-188189.html.>.
Bjorn et al., Christoph, "Punkbuster for Server Administrators—America's Army Edition." Even Balance, Inc. <http://www.punkbuster.com/publications/aa-ad/index.htm> Nov. 11, 2004.
Cronin et al., Eric, "Cheat-Proofing Dead Reckoned Multiplayer Games (Extended Abstract)." In Proc. ADCOG 2003. <http://warriors.eecs.umich.edu/games/papers/adcog03-cheat.pdf> Jan. 2003.
Delap et al., Margaret, "Is Runtime Verification Applicable to Cheat Detection?" SIGCOMM '04 Workshops. <http://conferences.sigcomm.org/sigcomm/2004/workshop_papers/net606-delap1.pdf> Aug. 30 & Sep. 3, 2004.
Dunsmore, Stuart "Punkbuster Server Manual (beta) version 0.947." Even Balance, Inc. <http://www.web.archive.org/web/20020211181729/www.evenbalance.com/pbmanual/serverman.htm> 2000-2001.
Emons, Winand "Escalating Penalties for Repeat Offenders," Oct. 2003.
Gauthier et al, Paul, "Dealing with Cheaters in Anonymous Peer-to-Peer Networks." University of Washington, Technical Report 04-01-03. Jan. 15, 2004.
Lomont, Chris "Secure Channel Communication," 2009, retreived from <http://www.lomont.org/Math/Papers/2009/Secure%20Channel%20Communication.pdf.
Rojas, Peter "Microsoft Locks Modded Xboxes out of Xbox Live," Nov. 11, 2004, Engadget.
World of Warcraft, "Game Manual." Blizzard Entertainment. <http://replacementdocs.com/download.php?view.2488> Oct. 27, 2004.
World of Warcraft, "Terms of Use." Blizzard Entertainment. <http://web.archive.org/web/20050304021845/www.worldofwarcraft.com/legal/termsofuse.html> Oct. 27, 2004.
PCT/US11/35587, International Search Report and Written Opinion mailed Aug. 9, 2011.
U.S. Appl. No. 11/415,881, Office Action mailed Mar. 6, 2014.
Examination Report for EP 07753269.5 mailed Aug. 19, 2015.
U.S. Appl. No. 12/917,642 Final Office Action mailed Mar. 25, 2016.
Chinese Application No. 201180063916.6 Office Action dated Jan. 6, 2015.

* cited by examiner

MANAGING GAME METRICS AND AUTHORIZATIONS

CROSS-REFERENCE TO RELATED APPLICATIONS

The present application is a continuation and claims the priority benefit of U.S. patent application Ser. No. 11/449,141 filed Jun. 7, 2006, which is a continuation-in-part and claims the priority benefit of U.S. patent application Ser. No. 11/415,881 filed May 1, 2006, which is a continuation-in-part and claims the priority benefit of U.S. patent application Ser. No. 11/386,039 filed Mar. 20, 2006, now U.S. Pat. No. 7,480,656. The disclosures of the aforementioned applications are incorporated herein by reference.

BACKGROUND OF THE INVENTION

1. Field of the Invention

The present invention relates, generally, to network gaming and more particularly to various metrics that may be implemented in the context of various systems and methods for validating game users and devices in a networked community of game players.

2. Description of the Related Art

Conventionally, users of electronic games compete with one another by selecting a two-player option associated with a particular electronic game via a single home gaming console. Accordingly, two players can play at the same time or one-at-a-time in order to compete for points or other awards associated with the particular electronic game.

As electronic game consoles have become more popular and network technologies have become more pervasive, more options for head-to-head competition have become available. Some electronic game consoles are equipped with modems or other network connectors for allowing users to communicate over a network through the exchange of data related to the game. By communicating over a network, users can connect to various other users' gaming consoles either directly or via intermediate computing nodes (e.g., a central server or other game consoles in a network) and compete against those various other users while playing a network game.

Disadvantageously, some users manipulate the network game in order to gain unfair advantages while competing with other users playing the same network game. For example, a user may slow or delay the rate at which the user's data is sent to other users so that the various other users do not receive the user's data in time to react appropriately.

Unscrupulous users may employ an external hardware device that manipulates the generation of or access to certain game data whereby a game character may be endowed with special powers, abilities or attributes (e.g., lives, ammunition, and weapons) not genuinely earned during game play. Similarly, a game character may become impervious (e.g., invisible) to attacks by other game players.

Certain software methodologies exist (either alone or in conjunction with the aforementioned hardware devices) wherein code is temporarily or permanently installed and/or modified in a gaming device allowing for similar advantages. Various other means and methods are known and employed by users in order to cheat or gain an unfair advantage during the course of networked 'community' game-play.

Cheating decreases user enjoyment of participating in a networked community game environment. For example, a particular user playing a network game without any illicit outside aides (e.g., cheat codes, hacks, and so forth) is at a distinct disadvantage versus a user who is making use of such illicit aides. The user who is not cheating may be overpowered, outgunned, or otherwise inferior in some respect to a user who is cheating regardless of the individual skills of those users. If the user who does not cheat is continually defeated by a user who does cheat—and often in quick and decisive fashion—the non-cheating user may lose interest in a particular game, a particular game network, or a particular product or service provider.

This loss of interest adversely affects game developers and network service providers who will sell less game titles or find fewer users utilizing their network game services, respectively. As such, there is an inherent interest for game developers, service providers, and honest game users to identify and eliminate cheating in a network or community game environment.

SUMMARY OF THE PRESENTLY CLAIMED INVENTION

An exemplary method for validating devices in a gaming network includes receiving game data generated by at least one device in the gaming network, the at least one device configured for play of a network game. At least one game metric from a library of game metrics is identified, the particular metric associated with the received game data. At least one aspect of the received game data is identified that does not correspond to the at least one game metric identified from the library of game metrics. Upon that identification, a one or more queries are sent to the device that generated the game data that does not correspond to the at least one game metric. A response to that query is utilized to determine whether the queried device is valid for continued play of the network game.

Another exemplary method for validating devices is also disclosed. This method comprises monitoring one or more devices interacting with a network game in the gaming network. Game data is received from the devices and evaluated in the context of at least one game metric associated with the particular network game. A determination is made as to whether the game data adheres to the particular metric whereby a validation process is implemented if the game data does not adhere to the aforementioned metric.

A system for validating client computing devices in a network game environment is also disclosed. An exemplary embodiment of the system includes a monitoring module configured to monitor game data received from one or more client computing devices playing a network game in the network game environment. The system also includes a rules library comprising one or more game metrics associated with the network game and an analysis engine configured to access the game metrics from the rules library and to determine whether the received game data complies with the accessed game metric. A query engine may also be implemented in the aforementioned system for the purpose of determine whether the one or more computing devices are validated based on a response to a query engine generated query.

DETAILED DESCRIPTION

Figure 1:
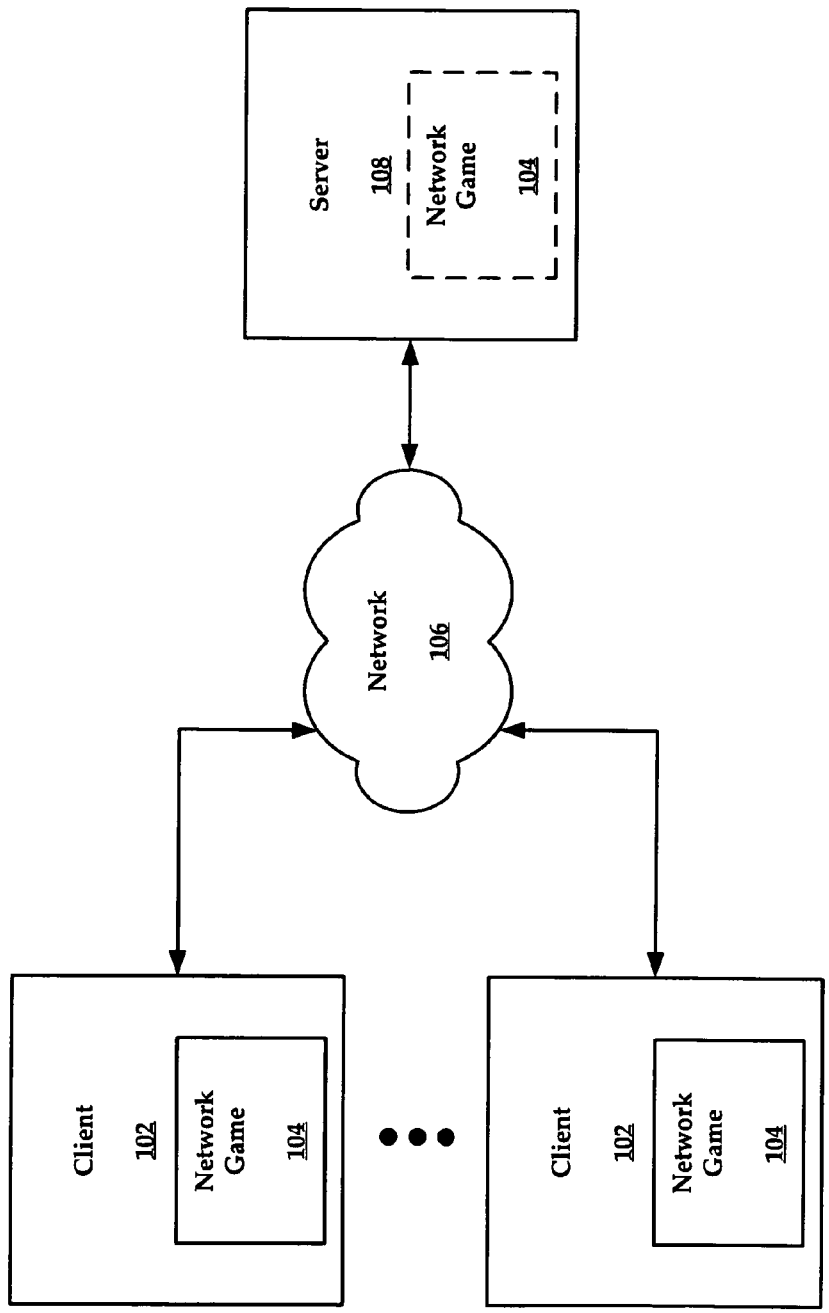
FIG. 1 illustrates a schematic diagram of an exemplary architecture for validating network users according to various embodiments of the present invention.

FIG. 1 illustrates a schematic diagram of an exemplary architecture for validating network game users according to various embodiments of the present invention. One or more clients 102 may include one or more network games 104. Network game 104 may be built-in (e.g., pre-loaded) to the client 102 or be introduced through an optical disk or other data storage medium. Network game 104 may also be obtained over a network as further discussed herein. The client 102 may be connected to a server 108 via a communications network 106 or to one another through an ad hoc network.

The client 102 may comprise a game console such as a PlayStation® 3, a laptop computing device, a portable game device such as the PlayStation® Portable, a desktop computing device, a cellular telephone, or any other device capable of executing the network game 104 and connecting to the network 106 or, alternatively, an ad hoc network. In some embodiments, the client 102 may be identified by an identification number such as a client ID or an address mechanism such as an IP address. In other embodiments, a user of the client 102 may 'sign on' to a network with a user name and/or password, which may be temporarily or permanently associated with the client 102.

In some embodiments of the present invention, the server 108 may include the network game 104 and the clients 102 may access the network game 104 on the server 108 via the network 106. The network game 104 on the server 108 may be the entire game, a portion of the game, data related to the game or simply a node allowing for the pass though, observation and/or collection of data related to the game 104 as the game 104 is played by users in the game community. The network game 104 may be similarly organized at various clients 102 (e.g., portions of the game or game data related to the game). Network game 104 may also be provided through, for example, a third-party content library server. In such an embodiment, the library server may or may not be a participating member of the presently disclosed validation architecture.

It should be understood that the reference to a client 102 and a server 108 is merely for the convenience of understanding various embodiments of the present invention. Embodiments of the present invention may be implemented in the context of a peer-to-peer network, a client-server network, or within a peer-group (e.g., a specified group of peers). Therefore, in some instances, a client may function as a server and vice versa depending on the timing and the nature of a data exchange. For example, various clients in a peer-to-peer network may each comprise a portion of a network game 104 or data related to that game 104 and may send and receive the same. As such, any reference to a client or a server is meant to be inclusive of operations performed by one or both computing entities unless specified otherwise by a specific limitation in the claims. In some instances, a device with client/server functionality may be referred to by the generic moniker, 'network node,' 'computing node,' or 'network device.' In that regard, client 102 and server 108 may both be considered network or computing nodes or a network device.

The network game 104 may comprise software that may be processed on or by the client 102 and/or that allows for or facilitates communication and data exchanges with the other clients 102 and server 108 via the network 106. The network 106 may include, for example, the Internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet.

Users associated with each of the clients 102 may interact with other users playing the network game 104. Accordingly, the users at each of the clients 102 may compete with one another despite not being physically present with one another or sharing a common gaming device or console.

In one exemplary embodiment, the server 108 may monitor the users playing the network game 104 via the network 106. The clients 102 may request data from the server 108, such as information pertinent to the particular network game 104 being played, bug patches, and so forth. Any type of communication exchange between the clients 102 and the server 108 is within the scope of the various embodiments of the present invention. Further, in some embodiments of the present invention, more than one server 108 may be connected to the network 106 for the purpose of communicating with the clients 102. For example, back-up or redundancy servers as well as servers with particular tasks such as storing identification information or preferences related to a particular user as well as servers tasked with certain DRM, advertising, or payment responsibilities.

In other embodiments of the present invention, the clients 102 may monitor the network games 104 being played by the other clients 102 (e.g., as individual nodes in a peer-to-peer network or peer-group network). The clients 102 may communicate data generated during the monitoring process to the server 108 or the clients 102 may store and process the data themselves. For example, in a peer-to-peer network scenario, each of the nodes in the network may monitor other nodes in the network for certain illicit behaviors.

The validation process implemented by the server 108, clients 102, and/or any one of a variety of nodes in the network may detect cheating or unusual activity with respect to the network game 104. For example, a game character may accrue more points than allowed or normally allotted, the game character may possess stronger powers than the network game 104 generally provides, and so forth. Any type of unusual behavior or activity may be detected via the monitoring process discussed herein (e.g., passive validation), as result of random queries (e.g., active validation) or a combination of the two (e.g., hybrid validation).

Figure 2A:
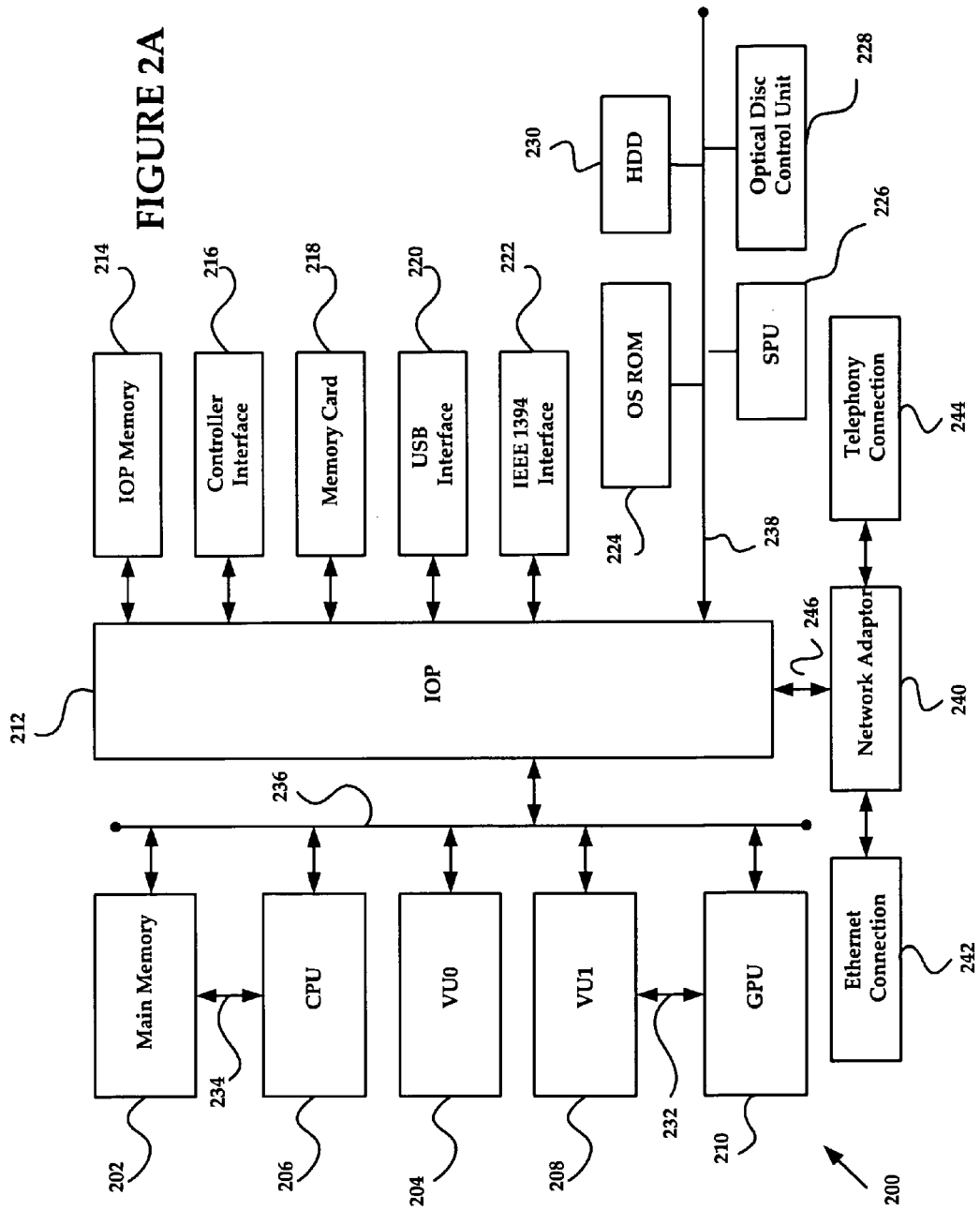
FIG. 2A illustrates a block diagram of an exemplary electronic entertainment system that may be utilized with certain embodiments of the present invention.

Referring now to FIG. 2A, a block diagram of one embodiment of an exemplary electronic entertainment system 200, such as may constitute client 102 and for playing the network game 104 in accordance with one embodiment of the invention is shown. The system 200 may comprise, but is not limited to, a main memory 202, a central processing unit (CPU) 206, vector processing units VU0 204 and VU1 208, a graphics processing unit (GPU) 210, all of which may be coupled via a bus 236 to an input/output processor (IOP) 212. The system 200 may also comprise an IOP memory 214, a controller interface 216, a memory card 218, a Universal Serial Bus (USB) interface 220, and an IEEE 1394 interface 222. The system 200 may further include an operating system read-only memory (OS ROM) 224, a sound processing unit (SPU) 226, an optical disc control unit 228, and a hard disc drive (HDD) 230, all of which may be connected via a bus 238 to IOP 212.

Some embodiments of the system 200 may also include a network adaptor 240, which may offer an Ethernet connection 242 and/or telephony connection 244. The system 200 is, in one embodiment, an electronic gaming console; however, the system 200 (or portions thereof) may also be implemented as a general-purpose computer, a set-top box, a hand-held gaming device, or in a mobile device such as a cellular phone. It should further be noted that various other system architectures may be utilized within the scope of the present invention.

Figure 2B:
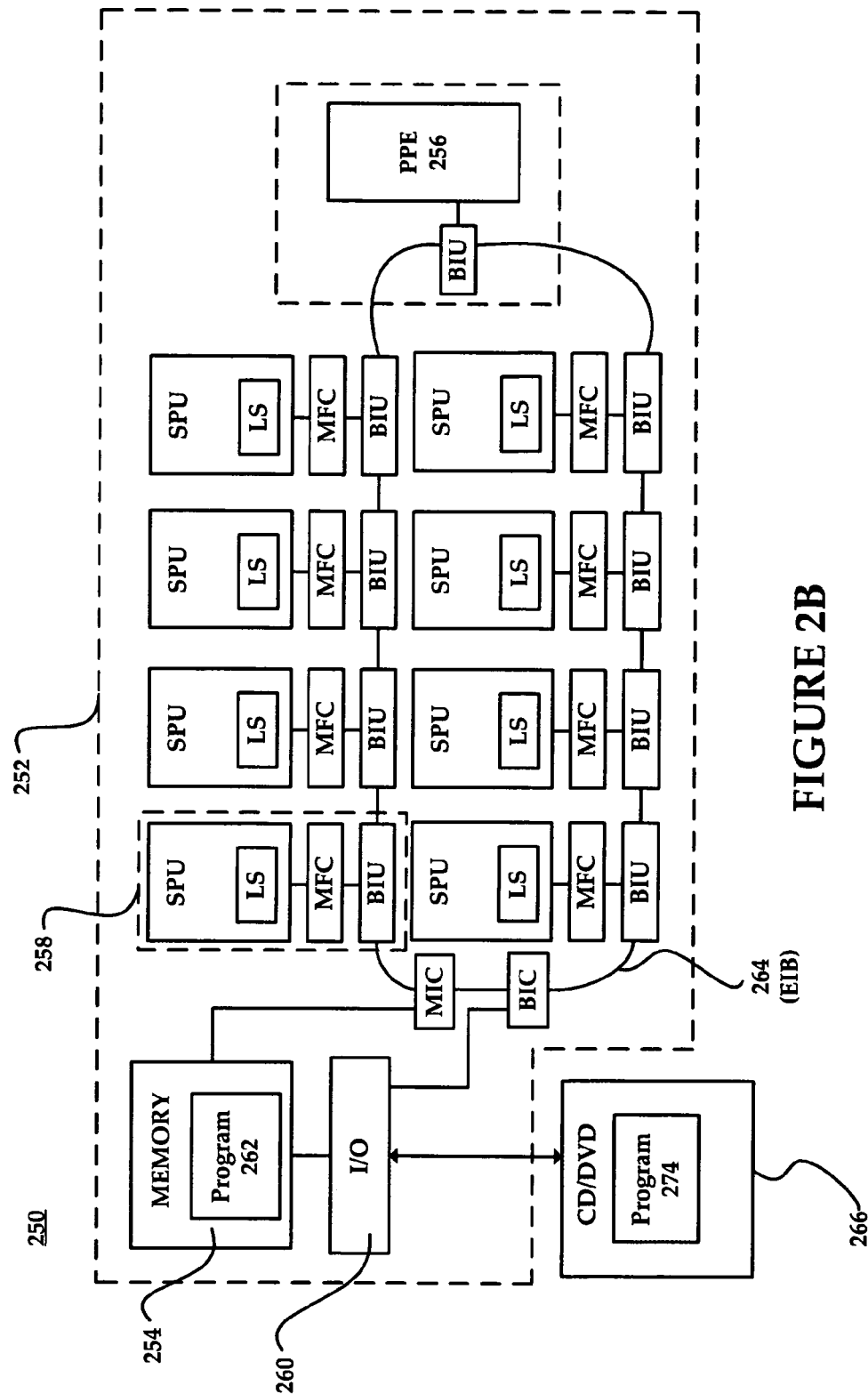
FIG. 2B illustrates a block diagram of a portion of an alternative exemplary electronic entertainment system including a control processor, a plurality of processing units, and a plurality of local memories that may be utilized with certain embodiments of the present invention.

An example of such an architecture is shown in FIG. 2B, which illustrates a portion of an electronic entertainment system 250 based on a Cell processor 252. Certain aspects of a computer architecture and high speed processing model utilizing a Cell processor are disclosed in U.S. patent publication number 2002-0138637 for a "Computer Architecture and Software Cells for Broadband Networks," the disclosure of which is incorporated herein by reference. The Cell processor architecture represents the work of Sony Computer Entertainment Inc., Kabushiki Kaisha Toshiba, and International Business Machines Corporation.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but can distribute that cell to another device for processing. Thus, the cells may migrate throughout a network for processing on the basis of the availability of processing resources on the network.

The cell processor 252, in one exemplary embodiment, comprises a main memory 254, a single power processor element (PPE) 256 and eight synergistic processor elements (SPE) 258. The cell processor 252 may be configured, however, with more than one PPE and any number of SPEs 258. Each SPE 258 comprises a synergistic processor unit (SPU) and a local store (LS).

Memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through bus interface units (BIU). The PPE 256 and SPEs 258 may access the main memory 254 over the EIB 264 through memory flow controllers (MFC) and memory interface controller (MIC).

Memory 254 may comprise a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274.

In some embodiments of the aforementioned processor, PPE 256 may be a standard processor capable of stand-alone processing of data and applications. In operation, PPE 256 may schedule and orchestrate the processing of data and applications by SPEs 258 and the associated SPU. In one embodiment, the SPU may be a single instruction, multiple data (SIMD) processor. Under the control of PPE 256, the SPUs may process data and application in a parallel and independent manner. MIC may control accesses by PPE 256 SPUs to data and applications in main memory 254.

Returning to FIG. 2A, which may implement a Cell processor like that described in FIG. 2B, the CPU 206, the VU0 204, the VU1 208, the GPU 210, and the IOP 212 may communicate via a system bus 236. The CPU 206 may communicate with the main memory 202 via a dedicated bus 234. The VU1 208 and the GPU 210 may also communicate with one another via a dedicated bus 232. The CPU 206 executes programs stored in the OS ROM 224 and the main memory 202. The main memory 202 may contain pre-stored programs and may also contain programs transferred via the IOP 212 from a CD-ROM, DVD-ROM, or other optical disc (not shown) using the optical disc control unit 228. The IOP 212 may be configured to control data exchanges between the CPU 206, the VU0 204, the VU1 208, the GPU 210 and other devices of the system 200, such as the controller interface 216, or from other such systems via the network adaptor 240.

The GPU 210 may execute drawing instructions from the CPU 206 and the VU0 204 to produce images for display on a display device (not shown). The VU1 208 may be configured to transform objects from three-dimensional coordinates to two-dimensional coordinates, and send the two-dimensional coordinates to the GPU 210. The SPU 226 may execute instructions and processes data to produce sound signals that are output on an audio device (not shown).

A user of the system 200 may provide instructions via the controller interface 216 to the CPU 206, which may be coupled to a control device comprising, for example, a joystick, directional buttons, and/or other control buttons. For example, the user may instruct the CPU 206 to store certain game information on the memory card 218, which may be removable (e.g., a flash memory or other non-volatile memory card), or may instruct a character in a game to perform some specified action. Other devices may be connected to the system 200 via the USB interface 220 and the IEEE 1394 interface 222, such as an external hardware device allowing for illicit gaming behavior (i.e., cheating).

Some embodiments of the system 200 may comprise a network adaptor 240. The network adaptor 240 may be configured to provide the hardware functionality necessary for the system 200 to connect to a network. The network adaptor 240 may comprise, for example, a system connector that operates to connect the adaptor 240 to the system 200 through an expansion bus connector 246. The network adaptor 240 may also comprise a power connector and data connector to allow for the provisioning of power from the system 200 to the adaptor 240 and the exchange of data between the system 200 and the adaptor 240. In some embodiments of the present invention, the network adaptor 240 may also require the installation of certain software in the system 200 to allow for identification and connection to a particular IP address and/or dial-up to a particular Internet Service Provider. Software may also provide other functionalities, such as the creation and maintenance of user profiles, in addition to functional interaction between the system 200 and the network adaptor 240.

The network adaptor 240 may also comprise an Ethernet connection 242. Through the Ethernet connection 242, a network cable (e.g., a 100 Base-TX or 10-Base T) may be coupled to the network adaptor 240 for connection to a network. The network cable may, for example, be communicatively coupled to a DSL or cable modem. The network cable may also be communicatively coupled to, for example, a router via a LAN port; the router may then be coupled to a DSL or cable modem through a WAN port. In further embodiments, the Ethernet connection 242 may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem.

The network adaptor 240 may also comprise a telephony connection 244. Through the telephony connection 244, a standard telephone line with, for example, an RJ-11C telephone connector may be connected to the network adaptor 240 and a telephone wall jack. In this regard, the network adaptor 240 may further comprise modem functionality such that the system 200 may communicate data over the public switched telephone network via the telephony connection 244. Other network connection methodologies and system architectures may be implemented within the scope of the present invention such as those disclosed in U.S. patent application publication number 2003-0142661 for a "System and Method for Distributing Data between a Telephone Network and an Entertainment Network," the disclosure of which is incorporated herein by reference.

Figure 3:
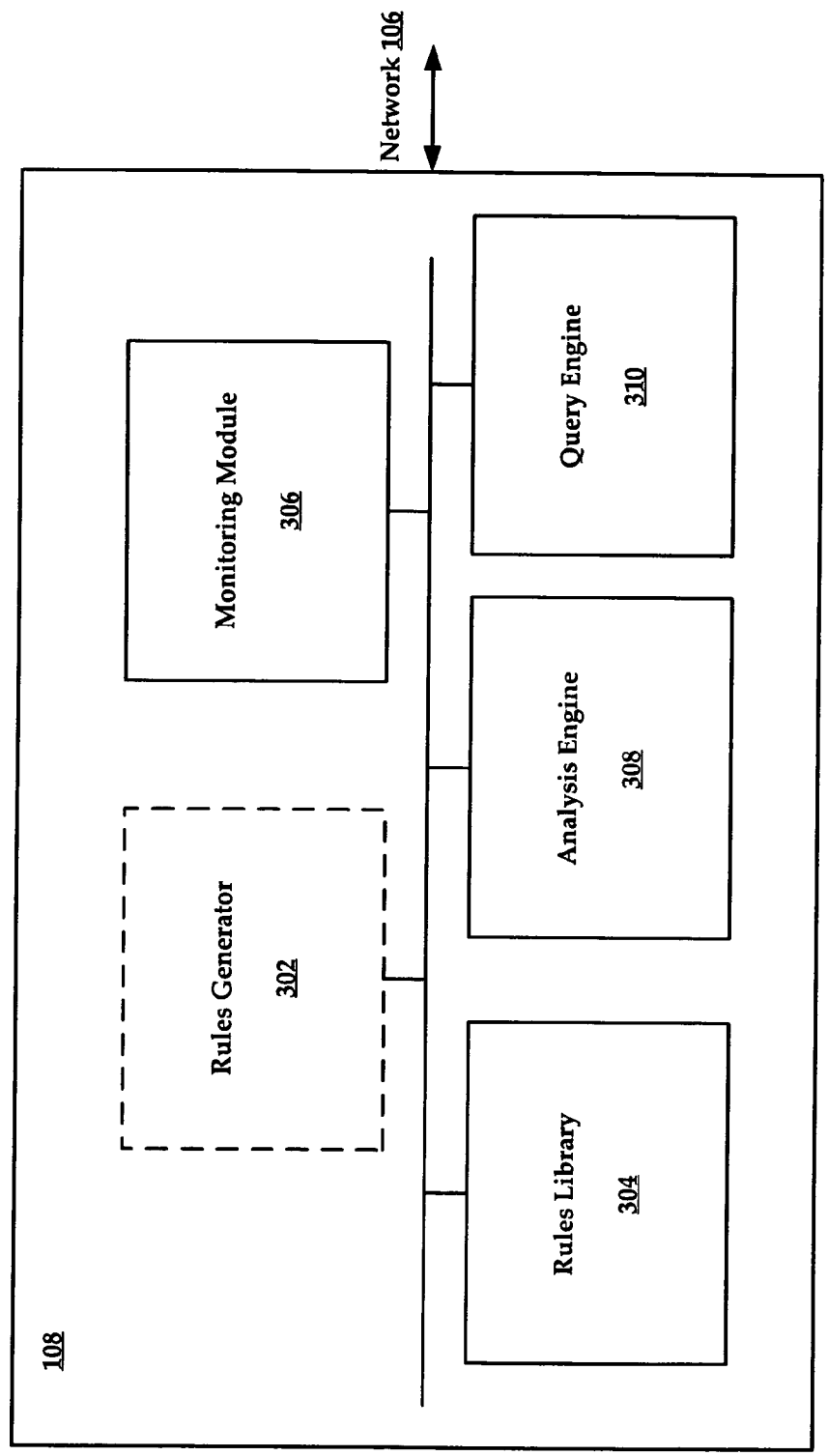
FIG. 3 illustrates an exemplary validation node according to an exemplary embodiment of the present invention.

FIG. 3 illustrates an exemplary validation node, such as the server 108 discussed in FIG. 1, according to one exemplary embodiment of the present invention. An optional rules generator 302 may create and/or process rules associated with the network game 104. The rules may include, for example, parameters for a game environment such as the game metrics discussed herein. In some embodiments, the rules/metrics may include, but are not limited to, appropriate character fatigue, speed, character strength, goals, power, ammunition, temporal variables, score ranges, prerequisites for advancement, frequency, and so forth.

Similarly, rules in the rules library 304 may encompass any identifiable aspect of the gaming environment or the hardware and/or software related to generating that environment. For example, the overwriting or modification of certain code in main memory 202, the presence of certain hardware devices with a particular device signature present in system 200 via USB Interface 220 or IEEE 1394 Interface 222 or the presence of certain data on a memory card 218 may be subject to a rule (e.g., prohibiting the presence of devices evidencing a particular signature). The receipt or presence of remnants of certain instruction threads including number, location or specific characteristics in, for example, main memory 202 or IOP memory 214 may also be subject to rules validation (e.g., cheating may not immediately be occurring but the presence of prior instruction threads related to cheating indicate cheating did at one point occur). The blocking of the transmission or receipt of particular data via network adaptor 240 may also constitute the basis for a rule (e.g., prohibitions of particular data transfers indicate cheating).

Rules are inclusive and may be independently generated by the optional rules generator 302 or otherwise related to data provided to the rules generator 302 (e.g., by a game developer). Optional rules generator 302, in this regard, may observe (e.g., through monitoring module 306) certain game parameters and develop a rule based on its observations of a particular network game 104. For example, the generator 302 may observe that gaining access to a particular level always requires meeting certain prerequisites. The generator 302 may develop a rule reflecting that if a user has achieved access to that particular level and has not met those prerequisites, that user is perhaps engaged in illicit behavior requiring validation. Those prerequisites may be observed by the generator 302 and/or related to information provided to the generator 302 by any number of sources (e.g., user, developer, automated signature update generators, and so forth).

A rules library 304 may be provided for storing the pre-defined or generated rules. Rules may be embodied in any variety of file and/or data types and the present invention does not seek to impose or otherwise limit the implementation of the same. Various other data may be stored in the rules library 304 according to some embodiments of the present invention. For example, statistics about one or more users of the network game 104 may be stored in the rules library 304, or any other storage medium or locale, according to some embodiments of the present invention. Alternative storage of statistics or other information may occur remotely from a network node but is otherwise accessible via the network 106. In some embodiments, the rules may be directly input into the rules library 304 or may have been independently or cooperatively developed by the rules generator 302.

A monitoring module 306 may be configured to monitor user activity with respect to the network game 104 at the client 102 via data exchanges with the server 108 via the network 106. Any type of monitoring may be implemented by the monitoring module 306 (e.g., periodic review of data exchanges, constant review of data exchanges, review of data exchanges from particular nodes, etc.). According to one embodiment of the present invention, the monitoring module 306 may utilize rules in the rules library 304 and analysis provided by the analysis engine 308 to passively listen for or detect user activity that deviates from typical user activity associated with the network game 104 or that might suggest the presence of such activity.

The data reviewed by monitoring module 306 may comprise normal game data generated in the course of game play (e.g., game metric related data). This may include data concerning position of a character, the number of lives remaining, the present score, and so forth. The data may alternatively or further comprise data specifically generated for the purposes of validation. This may include certain query response data, header data, encryption-related data, device status data and so forth.

Device status data may reflect the nature or identification of certain devices or peripherals coupled to client 102. The manufacturer of a particular network game 104 or client 102 may provide certain enhancement devices that, under certain circumstances (e.g., a special 'enhanced garners' session) are permitted during the game play or that might have substantial uses not related to cheating. The devices may be configured to provide a device signature identified by the client 102 and communicated as a part of, for example, specifically generated validation data monitored by the monitoring module 306. Similarly, illicit devices may generate an unrecognized or unapproved signature (either directly or through certain interactions with the client 102 or network game 104) that subsequently causes the generation of validation data by the client 102 as part of a device status report received by monitoring module 306.

In some embodiments, the monitoring module 306 may be located in particular client nodes within the network. For example, a particular network game 104 (e.g., one distributed on a CD-ROM) may include certain aspects of a validation system and related software embedded with the game software. As such, any client 102 in the network 106 may possess validation functionality in addition to a server 108.

A client 102 with validation software (e.g., monitoring module 306) may operate by itself or may operate in conjunction with the server 108 to ensure valid game play in the network. Client 102, in one embodiment, may possess the monitoring module 306 and rules library 308 in addition to other possible aspects of the validation architecture illustrated in FIG. 3 through a particular network game 104 title. As such, the client 102 may observe another client 102 in the network. If the monitoring module 306 observes illicit behavior through a data exchange with another client 102 in the network 106 (as might be identified through particular rules in the rules library 304 and/or determinations by the analysis engine 308), the client 102 observing such illicit behavior may take certain action in response to the illicit behavior.

Alternatively, the valid client may report the invalid client to the server 108 and the server 108 may engage in more detailed analysis of the purportedly illicit behavior through, for example, active queries as may be generated by a query engine 310. The server 108 may also engage in certain behavior designed to maintain the integrity of the gaming network such as dismissing the invalid client, overwriting invalid code through a pushed update, maintain a record of the invalid client and its related user and so forth. These various integrity maintenance actions may also be executed by client 102 (e.g., dismissals) or by client 102 in response to an instruction or request by the server 108.

By sharing and/or distributing validation responsibilities, bandwidth consumption and processing power of the server 108 may be alleviated and possibly avoids the involvement of an additional computing device in the validation relationship. That is, one client 102 may validate another and vice-versa through the course of regular data exchanges instead of using the server 108 as a validating intermediary.

Validation may also occur amongst a plurality of clients 102 in the network 106. For example, a first client 102 may engage in monitoring for a particular period of time with those responsibilities then taken over by a second client 102 at a later time. By randomly reassigning monitoring responsibilities (e.g., via server 108), more adept cheaters that may be able to avoid detection by a single monitoring entity must now deal with a constantly random and reassigned monitoring entity or entities.

Certain embodiments may also make use of group validation wherein a particular client 102 must be validated by two or more other clients 102 in order for that client 102 to be deemed valid or invalid. Group validation may occur in conjunction with the server 108 whereby the server may take into account the validation information from the group of clients 102 and make an ultimate determination as to whether game play is allowed to continue for that particular client 102. One of the one or more clients 102 participating in the group validation may alternatively be assigned lead validation responsibility and take appropriate action in response to generated validation information. Leadership responsibilities may also be distributed amongst the members of the group wherein the group acts collectively or certain client 102 members of the group carry out designated responsibilities.

Reassignment of monitoring responsibilities may also make use of client 102 with idle processing and bandwidth. For example, a client 102 might be connected to the network 106 but is not actively playing a game 106 or is currently in a 'waiting room' or 'game lobby' awaiting entry into a particular game 106. The available processing power of that otherwise idle client 102 may then be put to use through validation assignments or actual validation activity.

In alternative embodiments, a client 102 may download certain information from the server 108 such as rules or updates for the rules library 304 that may be only partially embedded with the game software of a network game 104. These updates or downloaded libraries may be temporarily stored in, for example, main memory 210 or a memory card 218. Rules updates or other related downloads may occur as a part of a regular schedule as determined by the server 108, as a part of a query by a client 102 to the server 108 for any variety of information, or during an initial log-on process wherein user names and passwords might be verified and that otherwise indicate the allowed permission of a particular user or client 102 in the network 106.

Rules or metrics, as noted, may indicate how fast a character associated with the network game 104 can move. The monitoring module 306 may observe characters in the network game 104 moving in excess of that speed and may flag one or more characters that moves faster than the rules indicate is allowed for further investigation or resolution. The monitoring module 306 may (e.g., in hybrid validation architecture) independently activate the query engine 310 in light of this apparently illicit activity that suggests cheating and cause the query engine 310 to deliver a query to the apparently offending node to better determine whether the node is in a valid or invalid state.

Such activity is referred to a hybrid validation in that validation begins passively (i.e., no active query to the offending node) but upon identification of possible illicit behavior, a query, which is generally indicative of active validation, is delivered to the offending node for a more accurate determination of valid or invalid behavior. The combination of passive and active validation, together, constitutes hybrid validation.

In some embodiments (e.g., in passive validation architecture), the apparently offending node may be summarily removed from the network without further investigation. Alternatively, data pertaining to this apparently illicit activity may be logged for future use and/or analysis. Such activity is referred to as passive validation in that no proactive determination of validity is made; the determination occurs as a result of 'listening' to traffic (e.g., game play information) from the node.

The monitoring module 306, in some embodiments—including both passive and hybrid validation—may forward any flags or unusual activity to the analysis engine 308. The analysis engine 308 may analyze the flagged activity to determine whether the activity is, in fact, illegal with respect to the game environment constraints of the network game 104. In other words, the analysis engine 308 determines whether the user activity, in fact, violates the rules associated with the network game 104.

The monitoring module 306 may receive data from the network game users as the network game users interact with the network game 104. For example, the client 102 may periodically post data to the server 108 or to the other clients 102 related to the network game 104 and/or the network game user's interaction with the network game 104. The monitoring module 306 reviews (e.g., 'listens to') the data as it is posted in order to determine whether the network game user associated with the client 102 that posts the data is cheating and/or failing to adhere to the one or more rules associated with the network game 104, as defined by the rules library 304. In an exemplary embodiment, the monitoring module 306 may forward the posted data to an analysis engine 308 and the analysis engine 308 analyzes and/or evaluates the posted data in light of rules from rules library 304 to determine whether the network game user 104 associated with the client 102 that posts the data is cheating and/or failing to adhere to the one or more rules associated with the network game 104.

For example, the network game user playing the network game 104 may play a nearly perfect game, such as achieving higher than usual scores. While, in many cases, this may be indicative of cheating, the user may simply be an above-average player. Data stored at the analysis engine 308, the rules library 304 or in another data storage locale or means (e.g., an ongoing record of particular game player activity and indicating an ongoing increase in quality of play over several sessions) may be utilized to make a determination whether this player is per se cheating or if further investigation via ongoing monitoring by the monitoring module 306 or, in the case of a hybrid validation scheme, a query from query engine 310 as described in FIG. 5 below.

Analysis engine 308 may also determine that while a user of a network game 104 presently has a particular advantage, this advantage may be one actually granted by the developer of the network game 104. For example, the game developer may have implanted an 'Easter Egg' or other 'hidden' functionality or bonus in the game environment such as temporary invincibility or excess speed. Certain bonus codes may also be recognized by the network game 104 and allow for game character or game environment enhancements. The analysis engine 308, through a query to the rules library 304, may determine that this particular behavior—while in any other context of the game would constitute cheating—is, in fact, permitted since the user has uncovered the Easter Egg or otherwise input an authorized code providing for such enhanced ability. The analysis engine 308 may also determine whether such enhanced functionalities have been disabled with regard to a particular network game environment and whether that activity, in light of that condition having been presently disabled, therein constitutes cheating.

The analysis engine 308 and/or the monitoring module 306, depending upon a particular embodiment, may then instruct the query engine 310 to send one or more queries to the user's game device (system 200) in order to gather data that helps the analysis engine 308 determine whether the user activity qualifies as cheating. The query engine 310 may send predetermined queries for the particular network game 104 or the query engine 310 may generate specific queries for the network game 104 based on the user activity that is flagged by the monitoring module 306.

For example, if the flagged behavior is one that is usually coupled with a particular cheat device (e.g., an external hardware mechanism), the query engine 310 may send a query to the client 102 seeking processor threads related to that device or seek a hash of memory that is traditionally modified by that device.

The query engine 310 may generate and sends queries to the client 102 on which the network game 104 is being played or that is otherwise connected to the server 108 to play the network game 104. Based on a the response to the query, analysis engine 308 may determine whether a client 102 or other network node is presently, has been or is otherwise configured to engage in illegal behavior (i.e., cheating).

Queries generated by the query engine 310 may be, in one exemplary embodiment, asynchronous in that they may be generated and delivered at any time. Other embodiments of the present invention, however, may utilize a particular schedule or time-table for the delivery of queries in order to, for example, optimize consumption of bandwidth. Accordingly, a query may only be generated when bandwidth consumption relative to a particular network game 104 is at an ebb versus during a high computational, high data exchange point of game play. Similarly, queries may be scheduled subject to the number of nodes present in a network; upon entry of new nodes to the network; or upon any other schedule as may be implemented by an administrator of the validation architecture.

Each node in the gaming community (e.g., client 102) may be configured to receive the query and respond as set forth by a series of instructional headers in the query packet. Providing incorrect or invalid data in response to the query may be construed as illicit behavior (i.e., cheating) and the invalid node may be dismissed from the community, logged, or otherwise dealt with as is determined by the particular construct of the validation architecture in place in a given community or with regard to a particular network game 104.

Failure of any particular node to respond to the query may be implicitly construed as an invalid response (i.e., the queried node did not respond because that node does not possess or cannot calculate the proper responsive data). Each query, as a part of the aforementioned instruction packet header, may reflect a time period in which a response must be generated and transmitted to the sending node. In other embodiments, the sending node may simply time the response of the query and unilaterally determine that a lack of response within a particular period of time constitutes an invalid response and therefore invalidate the queried node.

In certain networks, delivery of a response may be delayed or impossible due to a number of factors. For example, in a high traffic network, the proper and valid response may be generated by a queried node but temporarily delayed by the network due to traffic or other data priorities (e.g., the delivery of critical game data). The querying node may be configured to recognize when certain traffic conditions exist in the network and to adjust (via query engine 310) the query response time for providing a valid response.

Similar adjustments or allowances may be made in light of the particular network over which a queried node is connected to the querying node (e.g., a DSL line v. a wireless network v. a 56 kbps dial-up modem). A query and response are, at least with regard to a valid node, more readily transmitted and received over a DSL line, which comprises higher bandwidth than, for example, a dial-up modem. Similarly, if certain lightweight protocols are being used (e.g., UDP versus TCP), additional leniency may be allowed in that UDP, for example, offers few error recovery services unlike TCP, which guarantees delivery of data packets. In such a scenario, the query packet may never be received by the queried node and no indication of that failure will be communicated to the querying node. The querying node, via query engine 310, may take such possibilities into consideration, in conjunction with analysis engine 308, when determining if a response has been timely received and, further, with regard to disposing of an implicitly invalidated node.

In other embodiments of the present invention, if no response is received in response to a query, the query engine 310 may re-transmit the same query or, in order to prevent an illicit network node from having the benefit of additional processing time to determine the correct response to the query, generate a fresh query to that node. A particular node may be given so many opportunities to provide a valid response before the node is dismissed from the network or otherwise cataloged as having engaged in illicit community behavior.

The query itself may be intended to determine whether a node in the community network is valid, that is, is the node running instructions or functioning as is expected (e.g., has the runtime code been modified). Various cheating mechanisms may introduce new code to the system 200, usually in main memory 202 or IOP memory 214 although code related to illicit activity may also be found on a memory card 218. Certain device signatures related to a cheat device connected to the system 200 may further be identified at USB Interface 220 or IEEE 1394 Interface 222. The query seeks to determine whether known 'cheat' code is present or whether certain native runtime code at, for example, main memory 202 or IOP memory 214, has been modified as the result of a user having executed certain cheat code or the presence of a certain cheat device and its related signature, that cheat code having modified the native runtime code.

The query generated by the query engine 310, in one embodiment, may comprise requesting a section of memory from the client 102, that is, a start address and size. The client 102 then answers the query with the appropriate number of bytes of memory commencing at the particular address as requested by the query engine 310. Query engine 310, in some embodiments, will request a limited number of memory addresses in that the query aims to identify known portions of runtime code that are traditionally subject to modification or hacking with an aim toward cheating in a community network environment.

If the client 102 fails to respond to the query or provides the incorrect segment of memory as a result of the runtime code having been altered by illicit behavior (i.e., cheating), then the client 102 may be dismissed from the network or subject to other penalties or action (e.g., logging of an IP address, development of a record reflecting the client 102 or an associated user having been engaged in illicit behavior, restriction of bandwidth, etc.). A validated node (e.g., client 102) will identify a portion of memory that matches the expectations of the querying node (e.g., server 104) as reflected by a rule in rules library 304.

In another embodiment, the query engine 310 may generate a query concerning memory in the context of a hash function and at the client 102 in question. A hash function (H) is a transformation that takes a variable-size input (m) and returns a fixed-size string, which is called the hash value h (i.e., h=H(m)). The hash value concisely represents the larger data sample from which it was computed.

In the context of an embodiment of the present invention, the query generated by query engine 310 may identify a particular address and portion of memory as in previous embodiments of the present invention but further require the application of a hash function against the relevant data in memory. The response to the query (i.e., the hashed portion of memory) would then be required to match the hash value at the querying node (e.g., server 104) as might be reflected in a lookup table in rules library 304.

Hashing, as noted above, may be utilized to transform a string of characters associated with the memory requested into a shorter fixed-length value or key representative of the string. Through the use of hashing, efforts of more sophisticated hackers and cheaters are complicated in that it is nearly impossible to re-establish the original data from the hash value. A hash value is unique in the sense that two data sets are highly unlikely to result in the same bit string and any attempt to make changes to the data will negate the value and thus the signature. A hash function H is one-way in that given a hash value h, it is computationally infeasible to find some input x such that H(x)=h.

For example, applying the CRC32 hash algorithm against the data string <Sony> results in the checksum <69D07CFC>; the data string <Sony Computer Entertainment> produces the checksum <EF7F99BA>; and the data string <Sony Computer Entertainment America Inc.> results in the unique checksum <E3DE35CF>.

Examples of well-known hash functions that may be implemented in the present invention are MD2 and MD5 as reflected in Internet RFCs 1320 and 1321, which are incorporated herein by reference as well as the Secure Hash Algorithm (SHA) as is reflected in FIPS PUB 180, which is further incorporated herein by reference. CRC32 (cyclic redundancy check) is still a further example of a hash function that may be implemented in an embodiment of the present invention. Other known or later developed hash functions are within the scope of various embodiments of the present invention.

While impossible to re-establish the original data from the hash value, since a query from query engine 310 may refer to a limited number of memory addresses, it is conceivable that a hacker or cheater could independently generate a look-up table in light of a particular hash algorithm vis-a-vis a particular address and size (sometimes referred to, generally in the context of hacking computer passwords, as a dictionary attack). Thus, when a query is received concerning a particular address and size and hash algorithm, the cheater may provide the appropriate response via their look-up table. In order to overcome this possibility, some embodiments of the present invention may utilize a certain degree of randomization as to the particular memory segments queried.

Further embodiments of the present invention, as a means of overcoming independent look-up tables, may employ salting the hash as a part of the query generated by query engine 310. Salt is, in its simplest form, a unique string of some fixed length and is provided as a part of the query in the header instructions of the query packet. The memory segment identified by the query is concatenated with the salt and subsequently hashed. The possibilities of 'hacking' a response to the query are diminished almost to the point of impossibility and the time and processing power required to develop an independent look-up table on-the-fly would far exceed the response time limit to the query and the client 102 would be timed out for failure to respond to the query. A proper response will, like the memory query and memory/hash query, provide a response that matches the hash value at the querying node. Failure of the response to match that hash value may result in the queried node being designated invalid and removed from the community or otherwise addressed as is appropriate in the particular validation architecture.

The query, in some embodiments of the present invention, may further include the detection of threads as they occur through the use of certain cheat devices. A processor thread is generally recognized as the architectural state within a processor representative of a sequence of instructions. Certain devices, when installed, will introduce a series of threads in certain numbers and in certain locales in order to allow for the operation of the device in conjunction with the system 200. A query of, for example, main memory 202 or IOP memory 214 at client 102 may be related to detection of a known thread, a known number of threads, or the presence of threads in a certain location as evidence of illicit game activity (i.e., cheating) as identified by rules library 304.

In some instances, even after certain devices are removed from the system 200, the various threads related to that device will not be entirely purged from the system 200, usually main memory 202 or IOP memory 214. A query of client 102 may relate to the detection of these so-called 'ghost threads' and indicate that while a user is not immediately engaged in illicit game behavior the user may have previously engaged in such behavior and/or otherwise have the means to engage in such behavior in the future.

Queries may also pertain to identification of modules and strings of data in the system 200 as identified in the rules library 304. As these modules and strings may 'move,' especially in IOP memory 214, identification of the particular string or module versus a particular address may prove particularly useful with regard to actively validating a network device. Further, the jump locations in a particular segment of code may be 'nulled out' whereby code that has been relocated as a normal part of the IOP operation may be verified.

While any one of the aforementioned embodiments may be utilized in the context of a query, the query engine 310 may automatically determine or customize the particular query in response to activity detected by monitoring module 306 as may be the case in of passive validation architecture.

The analysis engine 308 may receive the data in response to the query generated by query engine 310 and determine whether the status of a client device is invalid and reflects cheating or other illicit behavior. If the client 102 fails to respond to the query from the query engine 310, the client 102 may be ejected from the network community either temporarily or permanently. In some embodiments of the present invention, the period a client 102 or a particular user associated with the client 102 at the time of ejection may increase with the number of ejections.

As previously noted, in some embodiments of the present invention, a window of time is specified for responding to the query. If the client 102 fails to respond to the query within that window of time, the server 108 may send another query, eject the user or client 102 from the network community, or allow the user to continue participating in the network game 104 and continue to monitor the user's activity at client 102.

In some embodiments of the present invention, like those related to passive validation, the analysis engine 308—in conjunction with monitoring module 306—may decide that the query engine 310 does not need to send a query. For example, the analysis engine 308 may determine that while a score associated with the network game 104 is high, it is not outside the parameters for scores set forth in the rules associated with the network game 104 as provided in the rules library 304 and otherwise observed by the monitoring module 306.

If the analysis engine 308 determines that the user is cheating, the offending node may be ejected, allowed to continue playing, and so forth. In some embodiments, the server 108 or sending node may resolve the violation (i.e., cheating activity) whereby various types of resolution may be employed. In some embodiments of the present invention, the node tasked with resolving the behavior (e.g., server 108) may disable a cheating device or offending code presently running on the system 200 by sending a patch to remove, modify, or add to the offending software.

In some embodiments, the analysis engine 308 may generate a list of users or client devices 102 that violate the rules associated with the network game 104. In other words, the analysis engine 308 may generate a cheater 'rap sheet.' The cheating users may then be monitored more often by the monitoring module 306 according to some embodiments or employed as a variable for generating future rules by the optional rules generator 302.

In some embodiments, the client 102 may include certain or all of the components discussed in FIG. 3 with regard to server 108 whereby device becomes more of a generic network node that may encompass server functionality, client functionality, both or neither (e.g., a router, buffer or intermediate point on a network). Accordingly, the client 102 can detect cheating activity occurring on other clients 102, as discussed herein. One node in the network may also generated queries of other nodes in response to an initial request by a server 108.

Nodes may also act in peer-groups whereby, for example, ten particular nodes constitute a group. Groups may be defined by the particular needs or nature of a particular network environment. For example, a group may constitute all players of a network game 104. A group may constitute all players of a network game 104 and participating via a particular ISP. A group may also constitute players in a certain 'game room,' that is, players that have been invited to participate with one another or otherwise entered a particular gaming environment of particular users. A group may be defined by any parameter that allows for delineation of one user from another (e.g., age, experience, game device being used, time logged on, type of network connection, bandwidth availability, etc.).

Other embodiments may provide for group participation in analysis of certain behavior. For example, multiple nodes (via monitoring module 306) may observe behaviors from a particular node. The behaviors observed may be identical or each involving different game behavior information. In some embodiments, an approval (e.g., validation) of same or varying behaviors as observed by various nodes may be required by all or a certain percentage of the observing nodes to further ensure the validity of the observed node in the community network.

Furthermore, although various components are discussed in connection with FIG. 3, the server 108 and/or the client 102 may include more or fewer components and still fall within the scope of various embodiments of the present invention. For example, responses to illicit behaviors may be carried out by a separate integrity module (not shown) in conjunction with or independent of, for example, analysis engine 308 as referenced above.

In the case of a hybrid validation scheme, the analysis engine 308 and/or the monitoring module 306, may then instruct the query engine 310 to send one or more queries to the user's game device (system 200) in order to gather data that helps the analysis engine 308 determine whether the user activity qualifies as cheating. The query engine 310 may send predetermined queries for the particular network game 104 or the query engine 310 may generate specific queries for the network game 104 based on the user activity that is flagged by the monitoring module 306. The queries may or may not be directly related to the unusual behavior observed by the monitoring module 306. A more detailed discussion of the generation, delivery, and analysis of queries is found in co-pending U.S. patent application Ser. No. 11/386,039, which has previously been incorporated herein by reference.

Figure 4:
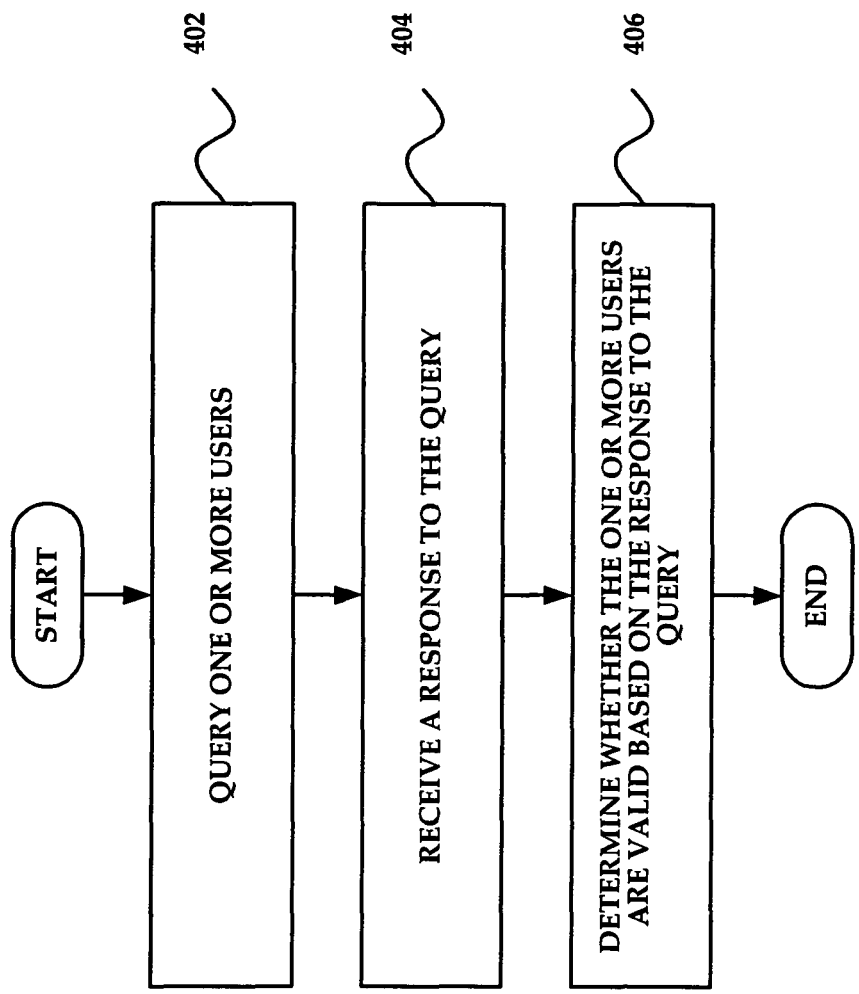
FIG. 4 illustrates a flow diagram of an exemplary process for actively validating network game users according to an exemplary embodiment of the present invention.

Referring now to FIG. 4, a flow diagram of an exemplary process for actively validating network game users is shown. At step 402, a query is sent to the one or more users. The query may be sent to a client 102 associated with the one or more users based on detected unusual activity, at specified intervals without detection of unusual activity, and so forth. Any method for determining when to send a query may be employed. As discussed herein, the query may be customized according to the network game user, the query may be predetermined, and so forth. The query may also comprise any type of query, such as a query requesting a specific area of the memory associated with the network game 104 or the network game user's participation in the game, a hash of the memory or specified area of the memory, a hash of the memory and a salt associated with the memory requested, identification of threads, modules, strings of data and so forth.

At step 404, an answer to the query is received. As discussed herein, in some embodiments, the one or more users may be ejected if the client 102 fails to respond to the query either correctly and/or in a timely fashion.

At step 406, it may determine whether the one or more users are valid based on the response to the query. As discussed herein, the network game user, may be considered valid if it is determined, by an analysis engine 308 at the server 108 or the other clients 102, that the network game user is not cheating, is not violating the rules associated with the network game 104, and so on. The response to the query may be utilized to further query the network game user where the response is not acceptable, or is otherwise suspicious.

The response may be analyzed by the analysis engine 308 in order to determine whether the network game user is valid. As discussed herein, the network game user may be warned, ejected from the network game 104, further monitored, and so forth. As also discussed herein, the violation or cheating may be resolved according to some embodiments, such as by sending data to add to, modify, or delete the cheating device, with or without notice to the network game user. Any type of resolution is within the scope of various embodiments of the present invention.

In some embodiments, as discussed herein, a list of cheating network game users may be generated and recorded, or stored. In other embodiments, a list of validated network game users may be generated. In other words, a list of the network game users that are not determined to be cheating may be generated, those users having established trust with the community over a period of time. Accordingly, the network game users that are validated may be monitored less while the network game users that have a history of cheating may be monitored more, according to some embodiments, or as may be determined by optional rules generator 302.

Figure 5:
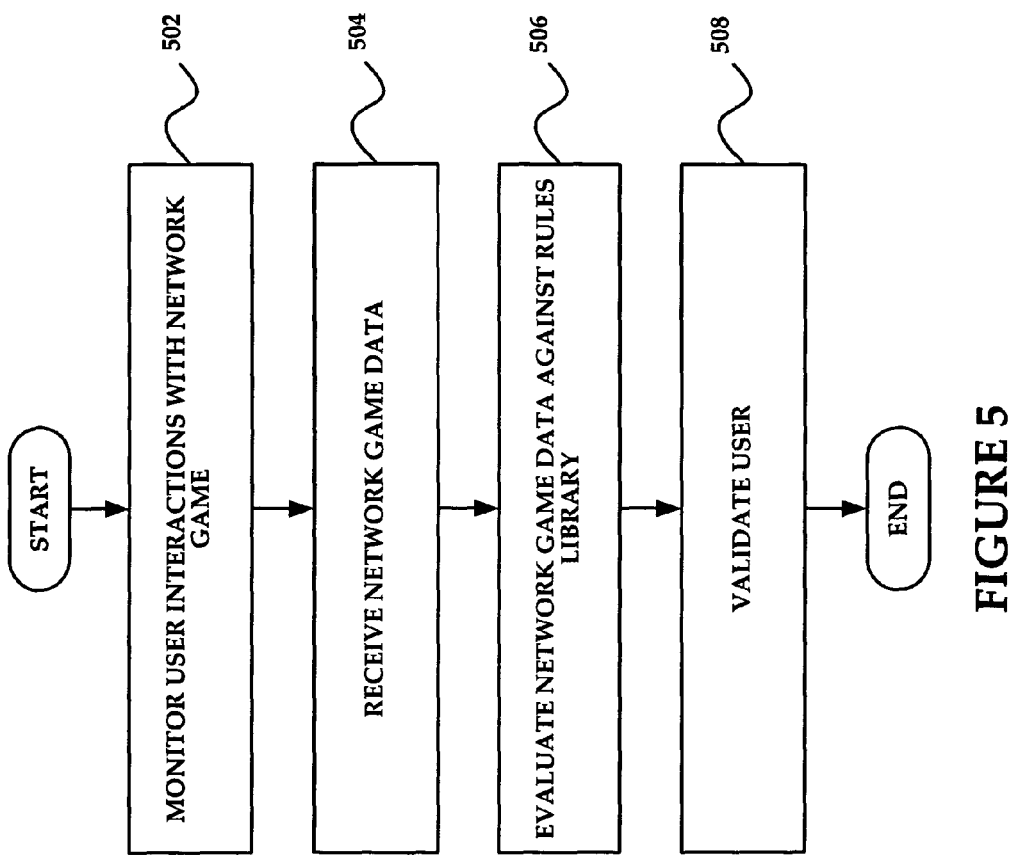
FIG. 5 illustrates a flow diagram of an exemplary process for passively validating network game users according to an embodiment of the present invention.

Referring now to FIG. 5, a flow diagram of an exemplary process for passively validating network game users according to various embodiments of the present invention is shown. At step 502, one or more users interacting with a network game in a network game environment are monitored. The network game, such as the network game 104 discussed in FIG. 1, may reside on the one or more clients 102 and/or on the server 108. As discussed herein, the one or more users may comprise the network game users. The monitoring module 306 may monitor the interaction among the network game users by observing activity and/or data via the network 106. For example, the monitoring module 306 may observe data transmitted from a first network game user to one or more second network game users, each associated with a client 102. In other embodiments, the data under observation may comprise the posting of a score or the saving of game data (e.g., progress in a game) at the server 108.

At step 504, data is received from the one or more users as a part of the aforementioned monitoring process. As discussed herein, the data may be received via the monitoring module 306 observing the network game users' interaction with the network game 104 and/or the data may be received as a result of the clients 102 posting data to the other clients 102 or the server 108. Any type of data may be received from the network game users according to exemplary embodiments.

At step 506, the data is evaluated to determine whether the one or more users adhere to one or more rules associated with the network game 104 or if the data is otherwise indicative of illicit game play. The monitoring module 306 may flag unusual network game user activity or data posted by the client 102 either alone or in conjunction with the analysis engine 310. This data may be evaluated as the data is posted/received or sometime after the data is posted/received. For example, analysis may occur during a level change, during a game save, during the introduction of a new player or departure of a player to/from the community, while a particular player is in a game lobby or waiting room and so forth.

Utilizing the one or more rules associated with the network game 104 (e.g., rules from library 304 including but not limited to various game metrics) the data may be evaluated to determine whether the network game user adheres to the rules while participating in the network game in step 506. For example, the one or more rules may indicate that the network game user participating in a sports game (e.g., a football game) may not be allowed more than three time-outs as to prevent a particular user an unfair advantage in plotting plays as the game advances. If the particular network game user posts data, or the data is otherwise observed, that indicates the particular network game user has used four or more time-outs, that user may be recognized as engaging in illicit (i.e., invalid) activity as the game user is presently failing to adhere to the rules defined by the particular network game 104 and/or rules library 304 (e.g., the user is violating a metric).

At step 508, the one or more users that adhere to the one or more rules associated with the network game 104 may be validated. As discussed herein, validating the network game user may comprise recognizing the validated network game user as legitimate, as a non-cheater, and so forth. In some embodiments, the validated network game user may be monitored less frequently. In some embodiments, the network game users that are not "validated" may be monitored more frequently than validated network game users. In yet other embodiments, the network game users that are recognized as cheaters based on failure to adhere to the rules associated with the network game 104 may be monitored more frequently, may be warned, and/or may be ejected from the network game 104. Any type of action or inaction based on validating the network game user is within the scope of various embodiments.

Figure 6:
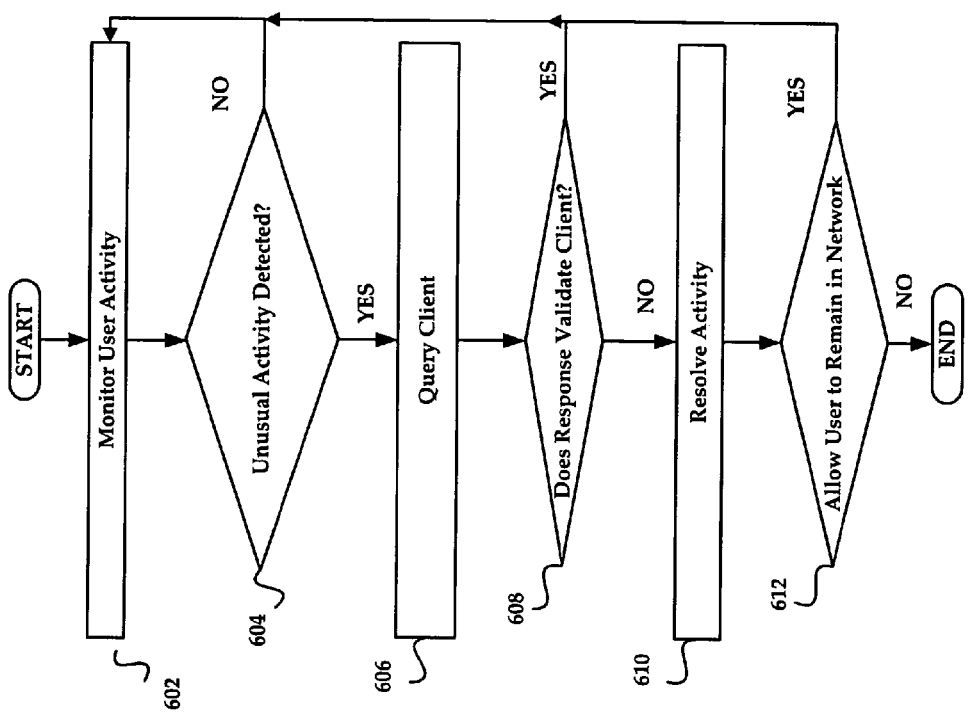
FIG. 6 illustrates a flow diagram of an exemplary process for validating network game users according to a hybrid validation scheme in accordance with an exemplary embodiment of the present invention.

FIG. 6 illustrates a flow diagram of an exemplary hybrid validation scheme according to various embodiments of the present invention wherein illegal game activity is identified. The illegal network game activity may include violation of the rules associated with the network game 104—including various metrics—or any other cheating activity by the network game users (e.g., glitching).

At step 602 network game play is monitored. The monitoring module 306 discussed in FIG. 3 may monitor user activity associated with the network game 104.

At step 604, a determination whether there is anything unusual about a particular player's actions in the network game 104 may be made. If no unusual activity is detected, the monitoring module 306 may continue to monitor the network game user's activities in the network game 104. This method is, in some respects, similar to the methodology set forth in FIG. 5. Unusual activity may constitute any activity that appears to violate a particular rule or metric.

In the case of a hybrid validation architecture, however, if unusual activity is detected in step 604, the query engine 310 may then send a query to a client 102 (e.g., one associated with unusual activity) at step 606 in response to the monitoring module's 306 identification of illegal behavior, which might occur in conjunction with analysis engine 308. Based on the response to the query, the analysis engine 308 may then further determine whether the unusual activity is illegal at step 608. If the node (e.g., client 102) is validated, monitoring module 306 may continue to monitor activity of nodes like client 102 in the network.

If the node (e.g., client 102) is not validated, certain illegal activity may be resolved at step 610. Various resolutions may be employed, such as sending software to the node to add to, modify, or remove the offending code, warning the user at the offending node, creating a watch list concerning the offending client/user, and so forth.

At step 612, the server 108 or, in a peer-to-peer or group-peer scenario, the clients 102, may determine whether to allow the network game user to continue to play in the network. If the network game user is allowed to continue to play, the node may remain subject to future queries and/or monitoring in active, passive or hybrid validation architectures as is appropriate. If the network game user is not allowed to continue, the server 108 or the other clients 102 may eject the network game user, such as by ceasing data communication with the particular network game user. In some embodiments, the network game user that is not allowed to continue participating in the network game 104 may be notified that the network game user is being ejected. In yet another embodiment, the network game user may be denied future participation in a particular network game or, in extreme cases, may be denied access to the gaming network or community.

With respect to the aforementioned references to various game metrics as may be employed for specific individual analysis (e.g., for the purposes of rule making and/or validation) and/or incorporation into an active, passive, and/or hybrid validation scheme, a game metric may be any rule, characteristic, aspect, definition, specification, classification, designation, taxonomy, nomenclature, measurement, property, function, principle, quality, guide, procedure, operation, law, order, control, restraint, regulation, decree, imperative, canon, tenet, directive, guideline, instruction, parameter, boundary, stricture, limitation, restriction, factor, consideration, check, or constraint applied to a game environment with regard to what may and may not happen in that environment. Metrics may be absolutes (e.g., always or never). Metrics may also be conditional (e.g., subject to conditions precedent or subsequent). Metrics may also be applied to the environment (e.g., laws of physics and game boundaries), objects within the environment (e.g., the presence of certain objects at certain times and at certain places and/or attributes related to those objects), and characters within the environment—both player and CPU controlled (e.g., character abilities, possessions, attributes, and so forth). Game metrics may also be applied to any other aspect of a game environment subject to the whims of a game designer or other 'rule maker,' which may be (but is not limited to) an automated system (e.g., rules generator 302), a game player, or a community of like-minded game players.

Game metrics may be built-in to a particular game (e.g., part of a rules library obtained from an optical disc or over a network in response to the play of the particular game). Game metrics may be part of an update library that may be downloaded to temporary memory, permanently saved in an ancillary memory device (such as a detachable memory card), or accessed from a central depository or other network node (e.g., another game player) over a network during game play. Game metrics—as noted—may also be designed and implemented by a particular game player through, for example, an authoring tool that may be a part of a particular game, as an ancillary software tool related to the game, or through individual coding of a metric that is subsequently installed at the proper point of access for a particular game, system, or gaming and/or validation architecture.

In one exemplary embodiment of the present invention, determination of whether a game player is abiding by particular metrics may occur through a particular client device (e.g., a gaming system) regularly reporting game data to, for example, a central game server (like server 108 of FIG. 1) or another game player's network device (like client 102 of FIG. 1). Analysis of that game data may take place as the game data is processed by the appropriate network device. For example, game data generated by one player may be analyzed by the opposing player with regard to abiding by particular game metrics as the first game player's game data is processed for display on the opposing player's gaming device. Similar analysis may take place at a central server prior to the game data being sent by the central server to another game player or players.

Processing of game data with respect to various game metrics may also take place at an otherwise idle network device (e.g., a game device connected to the network but presently idle as the game player is in a 'waiting room' awaiting entry into a network game). This idle device may analyze the game data for compliance with various game metrics while the devices of the game players who are actually in competition with one another may be focused on specific game play interactions whereby processing power and bandwidth between the two players is reserved solely or primarily for game play interactions (i.e., game metric analysis takes place on a computing device not presently involved in actual game play). Analysis of game play data with respect to compliance with various game metrics may also be distributed over a series of networked devices for peer analysis or parallel processing as may occur through the use of, for example, a Cell processor.

Upon a determination that particular game play data does not correspond to a particular metric, a validation methodology may be implemented to determine whether a game player with irregular or otherwise improper game play data with respect to that particular metric is engaging in illicit behavior (i.e., cheating). Through a validation process, a determination may be made with respect to a player who does not comply with a particular game metric (e.g., character abilities) and whether that player has an illicit game play device coupled to their client device (102) allowing for these advanced abilities.

The validation may be transparent in that the metric violation is recognized by a particular network device during the course of game play whereby active, passive, or hybrid validation is subsequently requested to take place all without the knowledge of the possible 'cheater.' Validation of the purportedly offending network node may take place in conjunction with the network node that first recognized the metric violation. Validation may also take place between the purportedly offending node and a network device dedicated or presently assigned to validation operations. Validation may also take place amongst a variety of network devices as has been described in greater detail with respect to peer evaluation or parallel processing.

In one exemplary embodiment, a game metric may be related to the health of a game character. For example, a game character, group of characters, companion character, or opposing characters (e.g., an enemy character as controlled by a CPU or by another player over a network) may be associated with a measurement of health. In some instances, the measurement may be reflected by hit points or a health percentage. A measurement of health may also be reflected as, for example, a visual depiction such as a 'health bar.'

As a game character competes in a game environment, the character may encounter various obstacles that represent some hazard or detriment to the health of the character. For example, the game character may be in a game environment simulating one-on-one combat such as a street fight or a boxing match. The game character may also be within a subsidiary environment of a larger game environment; for example, the game character may be in a head-to-head networked hockey game and one game character may get into a fight with an opposing hockey player during the course of the game. The fight between the two hockey players, in this example, is a part of the game for the purpose of added of realism but is not the focus of the game. That is, the fight between the players is a subsidiary gaming environment of the primary hockey game environment.

As a game character engages in fisticuffs with an opponent (regardless of whether the fight occurs in a primary or subsidiary game environment), the character will inevitably be struck by an opponent. For example, the game character may suffer various blows to the body as might occur through punches, kicks, or other physical activities such as being struck by objects (e.g., hit by a club swung by an opposing character). As would generally occur in the real world, the game character may suffer physical detriment with each blow to the body. These blows might cause various degrees of damage dependent upon, for example, the type of blow (e.g., a powerful upper cut versus a quick jab), the timing of the blow (e.g., a quick succession of blows or when the defense of a character is down), certain qualities of the other character (e.g., fighting skill or strength), certain qualities of the character under attack (e.g., stamina), whether any intervening instrumentality is involved (e.g., a first or a club or body armor worn by the party under attack), and the location where the blow is suffered (e.g., the head versus the chest versus the stomach).

With each blow suffered by the body of the character, the health of the game character may also suffer. The decrease in health may be represented in a variety of ways. For example, a hit point may be subtracted with each blow or a series of blows dependent upon, for example, the nature of the blow. Similarly, an overall health percentage may drop as attacks on the character continue. For example, the character may be at a particular percentage of overall health at one point in the fight and a lower percentage later on in the fight. As attacks on the character continue, blows suffered later in the fight wherein the character may possess lesser health may be more detrimental than those blows suffered at the outset of the fight when the character was stronger. If health is represented visually, a health bar may drop or a damage bar may increase during the course of combat.

In some instances, illicit game activity may offer invincibility or increased ability to withstand attacks to a game character under the control of the cheating user. For example, a game character may be struck repeatedly with a weapon (e.g., a sword). Notwithstanding the attack with a particularly dangerous weapon, if the game character has been illicitly granted invincibility, those attacks may cause little to no damage. In accordance with a particular game metric, however, it may be known that each blow inflicted by a particular weapon in a particular scenario results in the loss of a certain health percentage, hit points, and so forth. If the measurement of health fails to change in accordance with the game metric representative of health adjustments, this un-proportional adjustment in health may be indicative of illicit game behavior as made by possible by an illicit gaming device or code.

The initial illicit game activity (e.g., unwarranted invincibility) may be detected as a part of an active reporting of health status to, for example, a central game server (108) or other network device (e.g., the opposing game player's game client 102). The health status information as it pertains to the present combat may also be recognized through passive observation of game data at the aforementioned central game server (108) or other client device (102) on the network such as the other game player's system or an intermediate peer node (or group of nodes). The observation of the health status not adjusting in accordance with the particular game metric may, in and of itself, result in a determination of cheating based on, for example, the particular game or may result in the implementation of another validation mechanism (e.g., the activation and focused observation of a passive validation mechanism) or the issuance of a particular query (e.g., in the case of an active validation mechanism) that then focuses on specific validation data (e.g., the presence of illicit code).

Other health related metrics may be applied in addition to simple reductions in health relative to a particular attack. For example, a user may attempt to inhibit the health of another game character (e.g., a competitor). In this instance, a particular attack may result in only a loss of a particular number of hit points. Through illicit cheating, however, the attack may be 'amplified' such that excessive hit points are taken away from the player under attack or that certain defenses (e.g., armor) are nullified.

Additionally, a player may be able to 'regain' health through, for example, resting, ingesting health-related potions, utilizing first aid kits, or eating as may be subject to the particular game environment and/or story-line. In this example, a user may obtain more health points from a healing activity than should be normally granted. For example, a particular potion may be associated with the regaining of a particular number of hit points. Through illicit activity, however, that number may be doubled or otherwise altered such that the benefit is more than that intended by the particular designer and/or limits of the game. This activity may also be governed and observed through a game metric.

Additionally, the consumption of more health 'rewards' than are actually present in the game environment may be indicative of illicit behavior. For example, if a user starts with 100 hit points and then legitimately loses 60 of those points in combat, the user is left with 40 hit points. The particular game environment (e.g., a level) may have three health 'packets' present, the packets causing the regeneration of health. Two of those packets may be worth a 10 hit point increase while the third is worth 20. If, however, the game character is suddenly determined to again have 100 hit points in the environment following the aforementioned combat exchange (as may be caused through an illicit cheating device or cheat code), this change would violate a particular health metric in that it is mathematically impossible (in a valid game environment) to go from 40 hit points to 100 hit points—a 60 point increase—when all of the health resources combined in the environment would only provide a 40 point increase. If a game player goes over a maximum number of hit points (e.g., 120 hit points when 100 is the maximum), this may also indicate some illicit manipulation of the game environment through illicit behavior that may warrant the implementation of additional validation (e.g., passive, active or a hybrid approach) or straight forward resolution of the potentially illicit behavior.

In some instances, however, game designers may wish for game players to obtain certain reward codes that actually allow for game play that is abnormal. For example, a special reward of five seconds of invisibility for achieving an in-game reward or for inputting a secret code obtained from a game resource officially sponsored by the game. In these instances, the implementation of the authorized cheat (e.g., an 'Easter Egg') may be reflected in the game data that is actively reported and/or observed during the course of game play. If game data comprises an indicator that the behavior is the result of an 'authorized cheat,' then further validation may not be necessary as the game metric may reflect exceptions to the rule (e.g., metric violations caused as the result of an authorized cheat code).

Similar health-related game metrics may be implemented with regard to other game character features such as stamina. For example, a game character may be able to perform particular tasks, moves, skills, actions, and so forth subject to the maintenance of stamina above a particular level or percentage. As the stamina level of a character drops, however, abilities of the game character may suffer (e.g., the ability to absorb certain attacks or to perform certain skilled moves, etc.). In these instances, if stamina is illicitly altered as referenced above, the violation of a particular metric may indicate the need to activate a validation mechanism or to other take efforts to maintain community integrity.

For example, a game character may be traversing a desert or other extreme environment during the course of game play (e.g., a poison gas field or a volcanic field). As the character traverses that environment, overall health may suffer but stamina may also drop (i.e., the character can only survive so much adverse physical activity for so long before that activity begins to affect overall health and begin subtracting health points). If stamina is unaltered despite being in a particular environment, this may be indicative of illicit behavior in that the metric and general rules of the environment have been violated (e.g., any character in the volcano for a particular period of time should see a predetermined drop in overall stamina). Again, like health, the effect on stamina of a game character can be positive (e.g., irregular increases in stamina with respect to the environment or character characteristics) or negative (e.g., a particular drop in stamina such as fatigue is absent notwithstanding the extremes of a particular environment). In either case, the alteration may constitute the violation of a game metric that reflects the need for validation and/or community integrity maintenance.

It should be noted that various game metrics may exhibit certain degrees of flexibility. For example, a warrior may have higher health and higher stamina than would a magician. As such, there may be an overall metric that applies to health (e.g., a certain attack with a certain weapon should cause a drop in hit points) but that the metric may change based on other characteristics such as the type of game character. For example, being attacked with a club in the case of a warrior may cause damage but only in small increments. The much weaker magician, however, may suffer grave harm with each attack and may only be able to survive three or four blows before succumbing entirely to the injury. In that regard, if a particular character is seeing an alteration in health or stamina but not at a rate or percentage as associated with that particular character or other specific characteristics of the character, then this irregularity and violation of the game metric may reflect the need to implement a validation scheme and/or institute some element of maintaining community integrity.

Speed of a character may also be subject to a game metric. For example, a particular character may only be capable of running at a particular rate. Through illicit behavior, however, the character may be given unwarranted or undeserved boosts of speed. If a character is traversing an environment in excess of a norm (or limit), this activity may constitute violation of a game metric and reflect the need to institute validation and/or community integrity maintenance.

Game metrics may also be imposed with regard to capabilities or attributes of a character. For example, a wizard may be able to perform a series of spells whereas a warrior may have no magical powers. If during the course of the game, game data reflects that the warrior is casting magic spells, this may be indicative of a breach of the game metric governing capabilities (e.g., magic) or other character attributes.

By further example, a warrior may never be able to use a particular object, or understand certain information in an environment, or communicate with other game characters because of various attributes (e.g., dexterity, intelligence, and charisma, respectively). If that character is suddenly able to use a previously unusable object, to understand and utilize previous incomprehensible information, or to engage in an exchange of information with a previously inaccessible character, the metric as it applies to the particular activity and/or attribute may have been violated and validation and/or community integrity activities may become necessary.

Certain prerequisites may also be implemented in a game metric. For example, a game character may be able (in a civilization building game for example) to build an arsenal of nuclear weapons. The development of that arsenal may only be possible, however, if the game player has achieved certain technological advances with regard to rocket propelled flight, nuclear science, and aerospace navigation. If the game character is found to have nuclear weapons without having achieved certain prerequisites (e.g., rocket propelled flight), the failure to satisfy the prerequisite metric may be indicative of illicit behavior and the need to maintain community integrity or implement a further validation activity to check for illicit gaming devices or other behavior.

Similarly, the prerequisite may pertain to a particular skill, weapon, level, or task in a game. For example, a particular magical power may require learning a series of foundation or more elementary spells. The higher level magical power may, however, be more powerful and useful than the lower level, elementary spells. As such, a game player may have little to no interest in learning the lower level spells and engage in some illicit activity in order to obtain access to the higher level spell. The presence of that higher order spell in the absence of the lower-level prerequisite spells may indicate the violation of a particular game metric as it pertains to prerequisites. Likewise, if a game player obtains access to a higher level of a game or a more powerful weapon without first having satisfied some lower level prerequisite, illicit activity may be in effect and subject to detection by a passive, active, or hybrid validation scheme or the implementation of some action in order to maintain community integrity.

Metrics may also be imposed with regard to ammunition and/or the availability of particular weapons in an environment. For example, if a battlefield environment is populated only with a machine gun, a rocket propelled grenade, and a knife and a game character is then engaged in combat with a tank, the weapons metric may have been violated. Similarly, if the environment only has 10 rounds of ammunition for the rocket propelled grenade and the game character has fired off 15 rounds or has 15 rounds in their inventory, the metric again may have been violated, which may call for community integrity maintenance or some alternative validation activity.

The appearance of certain assets in a particular environment may be associated with a game metric. For example, only certain objects (e.g., weapons or rewards) may be found in certain levels and at certain times. If a particular weapon appears outside its predetermined level or time frame as may be governed by a particular game metric, illicit game activity may be in progress. As such, it may be necessary to engage in community integrity maintenance or to implement a validation routine. Similarly, if the game character obtains more of a particular asset than is presently available (e.g., 100 gold bars when only 10 are present), then the metric may have been illicitly violated. As may be the case in any or all of metrics of the present invention, certain 'Easter Eggs' or approved 'game enhancement cheats' may be identified either through game data or validation data as may be appropriate with respect to a particular game. In those instances, an indication that certain activity is the result of an 'authorized' cheat may not institute a further validation or community integrity process.

Metrics may also be applied to experience or ability of a game character. For example, as a game character advances through a game, engages in certain tasks, and completes certain objectives, the game character may become more experienced with regard to repeating those tasks in the future. In one example, if a game character is required to swim in a body of water, the character may be required to hold their breath as they swim underwater. Early on in game play, the game character may only be able to hold their breath for five seconds at a time thus requiring resurfacing for a new breath of air. As the game player engages in swimming over the course of the game, they may be able to hold their breath for extended periods of time (e.g., 30 seconds or 45 seconds). This increase, however, may be associated with particular experience in the game. For example, for every additional 1 second of 'breath holding' time, a game player must spend at least 5 minutes of game time swimming. If a particular ability or skill level is obtained without the proper experience associated with that ability, a game metric may have been violated indicating the need for the implementation of a validation scheme or community integrity maintenance.

A game metric may also be associated with the frequency of appearance of objects in a game environment. For example, in some games, various objects are presented for use by the game player such as weapons. Those objects (after having been acquired by a game player) may reappear in the environment over the course of time (e.g., rounds of ammunition may reappear 45 seconds after having been acquired). If an object reappears and is reacquired by a user prior to its particular frequency time period (e.g., a 45-second frequency object appears after 10-seconds), this may be indicative of a game metric violation in need of validation or integrity assurances.

A game metric may also apply to the particular power of an object. For example, a certain weapon or combat skill may result in a particular amount of damage to another character. Through various illicit game play devices or means, the power of that weapon, object, skill, and so forth may be amplified. If a weapon—albeit legitimately obtained—results in illegitimate results (e.g., opposing character damage), this may indicate the violation of a game metric in need of validation or integrity maintenance.

Game metrics may also be applied to temporal aspects of a game as has been previously referenced. For example, in a sporting event game, a user may have three-time outs. If a user is found to have called a fourth time-out as may be made possible through a cheat device, a game metric may have been violated thus requiring a subsequent validation or integrity maintenance process. Similarly, if a game has a ten minute game clock but (through, for example, an illicit game play device or other means) is manipulated to a shorter or longer time period as may benefit a particular player in a particular environment, a game metric may have been violated thus indicating the need for validation.

Metrics may also be implemented with regard to score. For example, a particular video game may implement an underlying mathematical determination with regard to collective skills of one player or team versus the collective skills of another player or team subject to certain variables controlled by the natural abilities of the actual game player. If one particular team (e.g., a low talent team X) beats another team (e.g., a high talent team Y) and does so outside the aforementioned natural game play abilities variable (e.g., team X should not be able to beat team Y by more than Z points), this may be indicative of illicit game play and suggest the need for validation or community maintenance.

Certain difficulties may accompany this metric in that certain game players are more skilled than others and other random or chaotic variable may result in a particular situation wherein team X does, in fact, beat team Y by more than the normal variable of Z points. It should first be noted that the lesser team beating the better team is not, in and of itself, indicative of illicit behavior. The defeat of the superior team may simply be an indication that illicit behavior may be in effect and that validation is necessary. It is quite possible that 'on any given day' one team may beat another. If this is such an instance, then the validation procedure should return a positive report reflecting the non-existence of illicit gaming tools (e.g., hardware, software, or related peripherals).

Notwithstanding this possibility of 'any given team on any given day' defeating a superior team (or force in the case of a military game), the game metric may—if a team exceeds the particular likelihood of victory or point differential in victory—look to previous game player performance as may be stored locally on the game player's device or at a central server maintaining a history of player performance. If a particular player has a regular and consistent history of lesser level teams beating higher level teams or regularly exceeding an average or predicted margin of victory, this determination may be a more accurate indicator of illicit behavior and indicate the need for validation of a particular network device or the implementation of community integrity maintenance.

Various other metrics may be implemented with respect to the physical universe of a particular game environment. In some video games, for example, a programming error may occur during game development that is missed during quality control. This error—while not necessarily fatal to the operation of the game—may allow for a certain player to obtain an advantage over another player, especially if other players are unaware of the condition. The advantageous use of these errors (or glitches) is often referred to as "glitching."

For example, a game environment may be comprised of a series of overlapping polygons. In the proper arrangement and with the proper textures and shading, these polygons appear as, for example, an arid mountain range that runs along side the edge of a video game environment (e.g., a desert warfare environment). In such an example, the mountain range may be represent the edge or boundary of the gaming environment beyond which the character and various game objects cannot (or are not intended to) interact. In some instances, however, through either an error during the software coding process or some other processing error, a 'crack' may appear between two or more polygons. A game player, if aware of this crack (glitch), may cause their game character to pass through this glitch and exist outside of the formal, defined gaming environment.

This game character that now appears outside the defined gaming environment may be able to continue to view the actual game environment in that one face of a polygon (i.e., the game environment side) may be textured or shaded (and thus opaque and incapable of being seen through) but the other face—the face outside of the game environment—may not be subject to any shading or texturing in that this side of the object was not intended to be viewed by game players, which is sometimes referred to as backface culling. Backface culling is the process by which polygons that are not facing the game environment are removed from a rendering pipeline. Further, certain rules governing the game environment may fail to be recognized or may not be applied outside the game environment as it was not intended for a game character to be engaged in game play outside of the defined environment. Thus, certain rules of the game that would normally see fired munitions ricochet off the mountain range may not apply on the 'other side' of the range. As such, the game character that is taking advantage of the glitch may actually be able to see 'into' the gaming environment without being seen by other game players because of the backface culling and, further, fire 'into' the game environment at enemy characters. Game players that are abiding by the rules of the game and that remain within the environment, in addition to not being able to see their attacker because of the opaque nature of the object environment, may not even be able to return fire in that their attack would be repelled by the face of the mountain (e.g., a rule governing the interaction of munitions and hard environmental objects).

In this example, however, the fact that certain activity is taking place outside the game environment may not necessarily indicate that an illicit gaming device is coupled to a game system and that the network device needs to be validated. While the game player is 'technically' cheating (in the sense that the game player has an unfair advantage), the player may be doing nothing more than taking advantage of an erroneously coded game environment. As such, validation of the game playing device may reflect that the device is not coupled to or otherwise benefiting from an illicit game play device. In these instances (i.e., cheating without external assistance), the validation architecture may still recognize illicit behavior, the absence of an illicit game play device, the further absence of any exception to a game play rule allowing for the questionable behavior (e.g., an Easter Egg) and subsequently take action (or cause for action to be taken) with regard to maintaining community integrity (e.g., killing the character, re-'spawning' the character in the game environment with or without the penalty of, for example, a lost life, or pausing real-time game play until the character reenters the normal bounds of the game environment).

Glitching may also relate to the game player being able to position their game character within the normal and defined game environment at positions wherein access is otherwise not possible (or least not intended). For example, the top of a building may offer a perfect vantage point for a sniper in a military role playing game. The building may offer a bird's eye view of a large portion of the game environment and may further offer particular cover for the sniper such that other game players cannot return fire and kill the sniper. Notwithstanding the advantages of this particular position, access to the rooftop position may not be possible (e.g., the intentional lack of stairs or other means intended for ascending to the top of the building such as a stack of crates). A game player may, however, discover a way to access the top of the building (e.g., parachuting from a plane to the top of the building) not otherwise anticipated by the game designers.

Despite the game designer intending for this portion of the game to be inaccessible, the forbidden environment nonetheless exists and the game player may be able to access the same and gain an unfair advantage over other game players. In these instances (i.e., cheating without external assistance), the validation architecture again may recognize illicit behavior, the absence of an illicit game play device, the further absence of any exception to a game play rule allowing for the questionable behavior (e.g., an Easter Egg) and subsequently take action (or cause for action to be taken) with regard to maintaining community integrity (e.g., killing the character, re-'spawning' the character in the game environment with or without the penalty of, for example, a lost life, or pausing real-time game play until the character reenters the intended bounds of the game environment).

Similarly, a game player may discover a bug or other error in game design that allows them to traverse large portions of the game environment in less than the normal time to move between two points. For example, a game environment may span fifty miles from East-to-West. A game character may only be able to traverse the environment at a rate of five miles per (game) hour. As such, it should take the game player ten hours (in game time, which may or may not correspond to real-world time) to traverse the entire environment. A game player may discover a glitch in the coding that causes a character to be positioned in one portion of an environment and to nearly instantaneously appear in another portion of the game environment (e.g., the opposite side of the environment). In this 'transporter'-like example, the game character may traverse the 50 mile environment in mere seconds of game time—speed that is physically impossible within the constructs of the particular game environment (i.e., as governed by a particular game metric).

Despite the game player having violated the game universe's laws of physics, the game player may nevertheless be able to violate those laws of physics and gain an unfair advantage over other game players. In these instances (i.e., cheating without external assistance), the validation architecture may recognize illicit behavior, the absence of an illicit game play device, the further absence of any exception to a game play rule allowing for the questionable behavior (e.g., an Easter Egg) and subsequently take action (or cause for action to be taken) with regard to maintaining community integrity. This community maintenance may include killing the character or re-'spawning' the character in the game environment with or without the penalty of, for example, a lost life.

Violating the game laws of physics may also occur in the context of an illicit game play device. For example, an automobile that only travels at 30 miles per hour may be traveling at 50 miles per hour with the assistance of a cheat device. The validation architecture, in this example, may undertake a validation activity and actually recognize the cheat device and take the appropriate action to maintain community integrity (e.g., disabling the offending code and/or device).

While various embodiments have been described above, it should be understood that they have been presented by way of example only, and not limitation. For example, any of the elements associated with the client 102, the network game 104, and/or the server 108 may employ any of the desired functionality set forth hereinabove. Thus, the breadth and scope of a preferred embodiment should not be limited by any of the above-described exemplary embodiments.

The present invention may be further implemented in a common network game 104 that is operable over a mixed network of end user devices (e.g., clients 102). For example, one client device 102 may be a personal computer; a second client device 102 may be a home entertainment system such as a PlayStation® 2 or PlayStation® 3 available from Sony Computer Entertainment Inc. Another client device 102 may be a portable gaming device such as a PSP™ (also from Sony Computer Entertainment Inc.) whereas a fourth client 102 may be a home entertainment system of a different manufacture such as an Xbox as manufactured by Microsoft Corporation or a GameCube as manufactured by Nintendo Co., Ltd. The present anti-cheat methodologies described herein are fully intended to be operable amongst a related or non-related group of devices.

What is claimed is:

1. A method for validating devices in a gaming network, the method comprising:
    storing a library of game metrics in a memory, wherein each stored game metric defines a rule of a game title in the gaming network;
    receiving over a communication network data regarding game play of the game title by a user device in the gaming network; and
    executing instructions stored in the memory, wherein execution of the instructions by a processor:
        identifies at least one aspect of the received game play data that does not correspond to a game metric from the library of game metrics,
        determines that the at least one aspect of the received game play data that does not correspond to the game metric is authorized,
        validates the user device for continued game play in the gaming network based on the determination that the at least one aspect of the received game play data that does not correspond to the game metric is authorized, and
        updates a list of validated user devices based on the validation of the user device, wherein a frequency of subsequent monitoring of the user device is based on validations of the user device over a period of time.

2. The method of claim 1, wherein the authorization is based on a hidden functionality provided by a developer of the game title.

3. The method of claim 1, wherein the authorization is based on a reward for an in-game achievement by a user of the user device.

4. The method of claim 1, wherein the authorization is based on a bonus code provided by a user of the user device.

5. The method of claim 1, wherein the authorization is based on a bonus code provided by a game resource associated with the game title.

6. The method of claim 1, wherein the authorization pertains to a predetermined period of time, and wherein the validation does not apply after the predetermined period of time has passed.

7. The method of claim 1, wherein the user device is validated less frequently based on a validation record indicating that no cheating has been detected for the user device over the period of time.

8. The method of claim 1, wherein the user device is validated more frequently based on a record indicating that cheating has been detected for the user device within the period of time.

9. A server system for validating devices in a gaming network, the system comprising:
    a memory that stores a library of game metrics, wherein each stored game metric defines a rule of a game title in the gaming network;
    a communication interface that receives over a communication network data regarding game play of the game title by a user device in the gaming network; and
    a processor that executes instructions stored in the memory, wherein execution of the instructions by the processor:
        identifies at least one aspect of the received game play data that does not correspond to a game metric from the library of game metrics,
        determines that the at least one aspect of the received game play data that does not correspond to the game metric is authorized,
        validates the user device for continued game play in the gaming network based on the determination that the at least one aspect of the received game play data that does not correspond to the game metric is authorized, and
        generates a list of validated user devices based on the validation of the user device, wherein a frequency of subsequent monitoring of the user device is based on validations of the user device over a period of time.

10. The system of claim 9, wherein the authorization is based on a hidden functionality provided by a developer of the game title.

11. The system of claim 9, wherein the authorization is based on a reward for an in-game achievement by a user of the user device.

12. The system of claim 9, wherein the authorization is based on a bonus code provided by a user of the user device.

13. The system of claim 9, wherein the authorization is based on a bonus code provided by a game resource associated with the game title.

14. The system of claim 9, wherein the authorization pertains to a predetermined period of time, and wherein the validation does not apply after the predetermined period of time has passed.

15. A method for maintaining community integrity, the method comprising:
    receiving gameplay data sent over a communication network from a plurality of player devices in a gaming network interacting with a game title, the gameplay data for each player device including a game status and one or more parameters associated with an observed game status; and executing instructions stored in memory, wherein execution of the instructions by a processor:
  determines that the one or more parameters are prerequisite to the observed game status;
  generates a rule that defines fair game play for the game title as meeting the one or more prerequisite parameters prior to achieving the observed game status, wherein failure to meet the one or more prerequisite parameters prior to achieving the game status is associated with cheating;
  evaluates subsequently received gameplay data for adherence to the generated rule, wherein a player of a player device that achieves the game status without meeting the one or more prerequisite parameters is identified as a cheater; and
  generates a list of cheating player devices based on the evaluation of the received gameplay data of the player device, wherein the identification of the player as a cheater increases a frequency of subsequent evaluations of the player device of the identified cheater for adherence to the generated rules.

16. The method of claim 15, wherein the generated rule is specific to the game title.

17. The method of claim 15, wherein the prerequisite parameters comprise an indication of authorization for the observed game status.

18. The method of claim 15, wherein the prerequisite parameters comprise compliance with laws of physics.

19. The method of claim 15, wherein the prerequisite parameters comprise compliance with a predetermined range or a predetermined limit.

* * * * *